US009423250B1

(12) United States Patent
Troy

(10) Patent No.: US 9,423,250 B1
(45) Date of Patent: Aug. 23, 2016

(54) POSITION MEASUREMENT CORRECTION USING LOOP-CLOSURE AND MOVEMENT DATA

(75) Inventor: James J. Troy, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 1007 days.

(21) Appl. No.: 13/593,216

(22) Filed: Aug. 23, 2012

Related U.S. Application Data

(63) Continuation-in-part of application No. 12/640,211, filed on Dec. 17, 2009, now Pat. No. 8,279,412.

(51) Int. Cl.
| | |
|---|---|
| *G01C 17/38* | (2006.01) |
| *G01C 1/10* | (2006.01) |
| *G01C 21/16* | (2006.01) |
| *F41G 7/34* | (2006.01) |
| *G01C 25/00* | (2006.01) |
| *B64F 5/00* | (2006.01) |
| *G01S 5/16* | (2006.01) |

(52) U.S. Cl.
CPC ... *G01C 1/10* (2013.01); *B64F 5/00* (2013.01); *F41G 7/34* (2013.01); *F41G 7/343* (2013.01); *G01C 21/16* (2013.01); *G01C 25/005* (2013.01); *G01S 5/16* (2013.01)

(58) Field of Classification Search
CPC ............. G05D 1/10; F41G 7/34; F41G 7/343; G01C 21/16; G01C 25/005; G01S 5/16; B64F 5/00
USPC .............................................. 702/94; 73/1.38
See application file for complete search history.

(56) References Cited

U.S. PATENT DOCUMENTS

| | | | | |
|---|---|---|---|---|
| 6,292,751 B1 * | 9/2001 | Frank | ..................... | G01C 21/16 701/505 |
| 7,640,106 B1 * | 12/2009 | Stokar | ..................... | G01C 21/16 342/147 |
| 7,761,233 B2 * | 7/2010 | Schott | .................. | G01C 21/005 701/434 |

(Continued)

FOREIGN PATENT DOCUMENTS

| | | |
|---|---|---|
| DE | 10 2005 004155 A1 | 8/2006 |
| WO | WO 00/39576 A1 | 7/2000 |

OTHER PUBLICATIONS

Coschurba et al., Research Issues in Developing a Platform for Spatial-Aware Applications, ACM SIGOPS European Workshop, XP-002353381, Sep. 17, 2000, (6 pgs).

(Continued)

*Primary Examiner* — John Breene
*Assistant Examiner* — Eyob Hagos
(74) *Attorney, Agent, or Firm* — Toler Law Group, PC

(57) ABSTRACT

A method includes initializing an inertial measurement unit (IMU) at a starting location and gathering acceleration and rotational data as the IMU is moved to an intermediate location. An indication that the IMU is at the intermediate location is received. The method includes gathering acceleration and rotational data as the IMU is moved to an ending location and calculating a position of the ending location based on a known position of the starting location and the acceleration data. The method includes calculating corrected acceleration data based on a difference between the calculated position of the ending location and a known position of the ending location, and calculating a position of the intermediate location based on the corrected acceleration data are provided.

20 Claims, 9 Drawing Sheets

(56) References Cited

U.S. PATENT DOCUMENTS

| | | | |
|---|---|---|---|
| 2003/0084704 A1* | 5/2003 | Hanse | G01P 21/00 73/1.38 |
| 2005/0251328 A1* | 11/2005 | Merwe | G01S 19/49 701/472 |
| 2006/0023203 A1 | 2/2006 | Gatsios et al. | |
| 2006/0071851 A1* | 4/2006 | Graas | G01S 19/29 342/357.395 |
| 2006/0180648 A1* | 8/2006 | Miller | G01S 17/89 235/375 |
| 2007/0038409 A1 | 2/2007 | Gilson et al. | |
| 2007/0139262 A1* | 6/2007 | Scherzinger | G01C 15/00 342/357.32 |
| 2008/0294342 A1* | 11/2008 | Hoshizaki | G01C 21/165 701/472 |
| 2008/0306689 A1* | 12/2008 | Kourogi | G01C 21/165 382/107 |
| 2009/0073034 A1 | 3/2009 | Lin | |
| 2009/0112349 A1 | 4/2009 | Cobb et al. | |
| 2009/0254278 A1* | 10/2009 | Wang | G01C 21/165 701/472 |
| 2010/0102980 A1 | 4/2010 | Troy et al. | |
| 2010/0121601 A1* | 5/2010 | Eckert | F41G 7/007 702/104 |
| 2011/0149266 A1 | 6/2011 | Motzer et al. | |
| 2013/0185020 A1* | 7/2013 | Stephens | G01C 21/165 702/182 |

OTHER PUBLICATIONS

International Search Report and Written Opinion of the International Searching Authority, International Application No. PCT/US2010/056564, European Patent Office, Feb. 25, 2011, (12 pgs).

U.S. Appl. No. 12/640,211 Non-Final Office Action dated Jan. 5, 2012, (12 pgs).

Bebek O. et al., "Personal Navigation via High-Resolution Gait-Corrected Inertial Measurement Units", IEEE Transactions on Instrumentation and Measurement, vol. 59, Issue 11, Apr. 19, 2010, pp. 3018-3027.

Ojeda L. et al., "Non-GPS Navigation with the Personal Dead-Reckoning System", SPIE Defense and Security Conference, Unmanned Systems Technology IX, Orlando, Florida, Apr. 9-13, 2007, 11 pages.

* cited by examiner

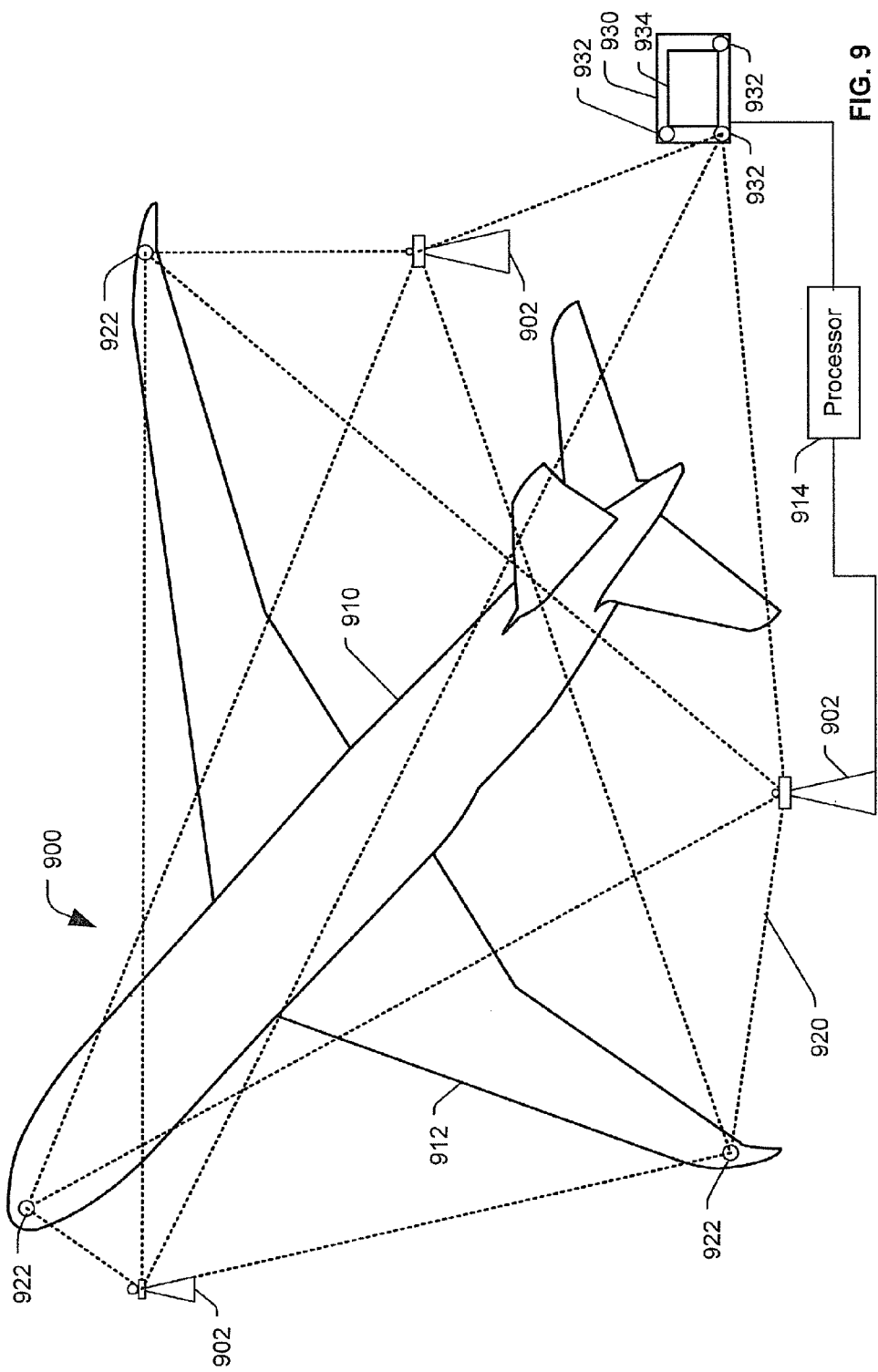

POSITION MEASUREMENT CORRECTION USING LOOP-CLOSURE AND MOVEMENT DATA

CLAIM OF PRIORITY

This application is a continuation-in-part of and claims priority to U.S. patent application Ser. No. 12/640,211, filed on Dec. 17, 2009 and entitled "POSITION AND ORIENTATION DETERMINATION USING MOVEMENT DATA," the contents of which are incorporated herein by reference in their entirety.

FIELD OF THE DISCLOSURE

The present disclosure is generally related to position and orientation determination using movement data.

BACKGROUND

Assembly and maintenance of large objects, such as repositionable structures, may be assisted by the use of positioning systems to guide placement of components. For example, aircraft may be assembled in facilities that include position determination systems and equipment to measure the position of certain components of the aircraft, such as wings and empennage, to ensure proper placement of the components. Other large-scale assembly facilities may use similar position determination systems. Certain position determination systems are limited to line-of-sight measurements. These position determination systems may not be useful to determine position information in interior or other occluded areas of the structure being assembled or maintained. For example, a laser-based system that is oriented to determine the position of the wings of an aircraft may not be able to also determine positions of components within a cargo bay of the aircraft.

SUMMARY

Position determining systems and methods are disclosed. A particular method includes initializing an inertial measurement unit (IMU) at a starting location and gathering acceleration data as the IMU is moved to an intermediate location. The method also includes receiving an indication that the IMU is at the intermediate location. The method further includes gathering acceleration data as the IMU is moved to an ending location. The method also includes calculating an estimate of the position of the ending location based on a known position of the starting location and the acceleration data. The method further includes calculating corrected acceleration data based on a difference between the calculated position of the ending location and a known location of the ending location. The method also includes calculating an estimate of the position of the intermediate location based on the corrected acceleration data.

In a particular embodiment, a positioning device includes a memory, an inertial measurement unit (IMU), and a processor. The processor is configured to initialize the IMU at a starting location, to gather acceleration data as the IMU is moved to an intermediate location, to receive an indication that the IMU is at the intermediate location, to gather acceleration data as the IMU is moved to an ending location, and to calculate an estimate of the position of the ending location based on a known position of the starting location and the acceleration data. The processor is further configured to calculate corrected acceleration data based on a difference between the estimated position of the ending location and a known location of the ending location and to calculate an estimated position of the intermediate location based on the corrected acceleration data.

In another particular embodiment, a non-transitory computer-readable storage medium includes instructions that, when executed by a processor, cause the processor to initialize an inertial measurement unit (IMU) at a starting location, to gather acceleration data as the IMU is moved to an intermediate location, to receive an indication that the IMU is at the intermediate location, and to gather acceleration data as the IMU is moved to an ending location. The instructions also cause the processor to calculate an estimate of the position of the ending location based on a known position of the starting location and the acceleration data, to calculate corrected acceleration data based on a difference between the estimated position of the ending location and a known location of the ending location, and to calculate an estimate of a position of one or more intermediate locations based on the corrected acceleration data.

The features, functions, and advantages that have been described can be achieved independently in various embodiments or may be combined in yet other embodiments, further details of which are disclosed with reference to the following description and drawings.

BRIEF DESCRIPTION OF THE DRAWINGS

FIG. 9 is an illustration of another embodiment of a local positioning system including a portable device.

DETAILED DESCRIPTION

The present disclosure relates to correcting errors in positions determined based on linear acceleration and rotational rate data measured by an inertial measurement unit (IMU). The IMU may be a component of a portable device that interacts with a positioning system to determine position information at locations where the positioning system cannot independently determine the position information due to, for example, access, expense, time, capacity, or functional limitations of the positioning system. The portable device may be useful for maintenance or assembly of large-scale structures, such as aircraft, watercraft, land craft, space craft, oil platforms, heavy equipment, or other repositionable or stationary structures. Such target structure may be assembled in facilities that use positioning systems to improve precision, accuracy or speed of an assembly or maintenance process. Certain positioning systems, such as laser positioning systems, may be limited to uses that are in a direct line-of-sight to a position sensing device. Accordingly, positions inside the target structure may be difficult to determine. The portable device may be operable to determine position information inside the target structure or at other locations. Additionally, the portable device may use the position and orientation information to provide other useful functions to an operator, such as identifying locations of particular components, identifying components based on location, gathering and storing information at particular locations, and so forth.

Figure 1:
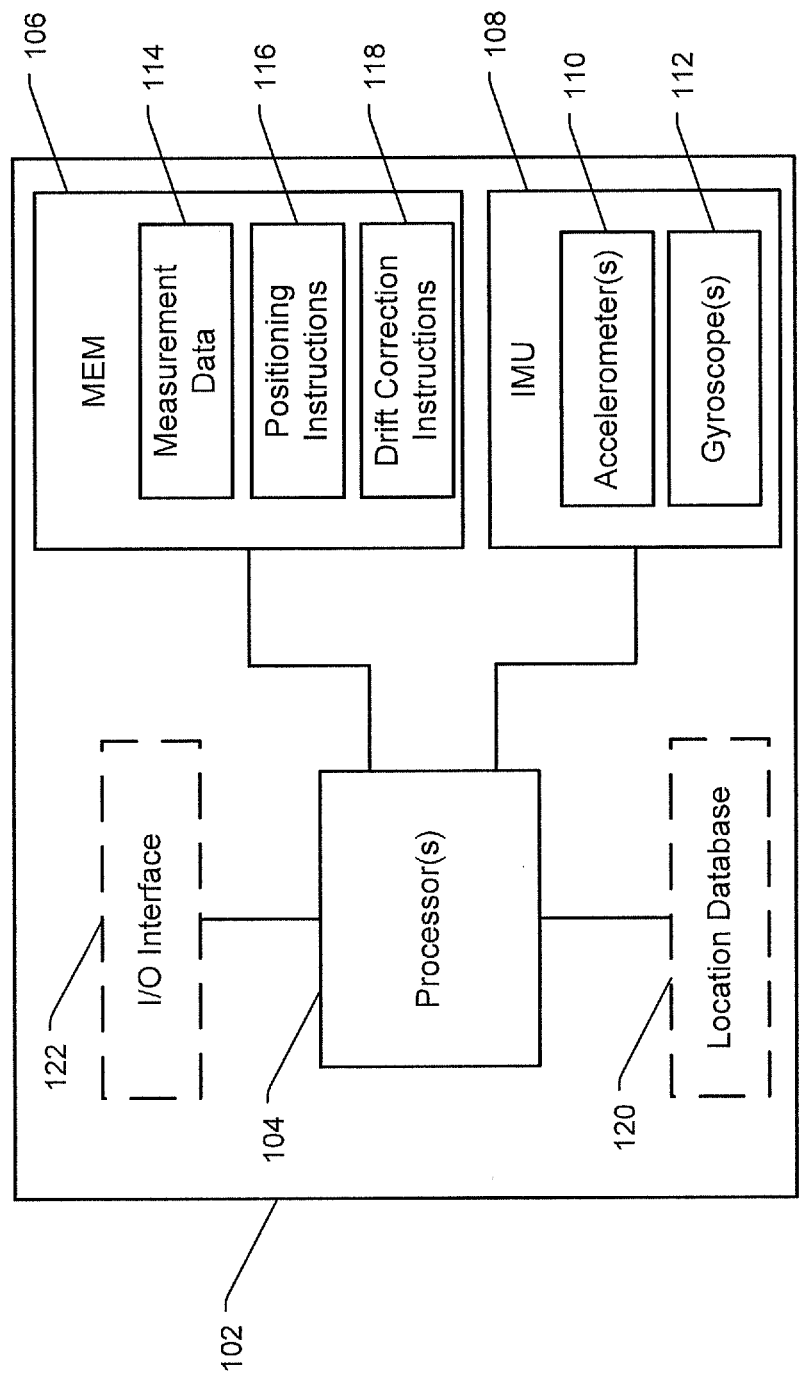
FIG. 1 is a block diagram of an embodiment of a position measurement system.

FIG. 1 is a block diagram of an embodiment of a position measurement system. The position measurement system includes a portable device 102. The portable device 102 includes one or more processors 104, a memory 106, and an inertial measurement unit (IMU) 108. The IMU 108 may include one or more accelerometers 110, one or more gyroscopes 112, or both. In a particular embodiment, the IMU 108 may include one or more magnetometers (not shown). As the portable device 102 is moved, the accelerometers 110 may periodically or continuously measure linear acceleration of one or more axes and the gyroscopes 112 may periodically or continuously measure rotational rates of one or more axes. The linear acceleration measurements and the rotational rate measurements may be stored as measurement data 114 in the memory 106. In an embodiment, the accelerometers 110 and the gyroscopes 112 may take measurements along three orthogonal axes.

As shown in FIG. 1, the memory 106 may include positioning instructions 116. The positioning instructions 116 may be executable by the processor 104 to transform the acceleration data 114 into positions within a coordinate system local to the portable device 102. For example, the positioning instructions 116 may include numerical integration instructions executable by the processor 104 to determine a position within the coordinate system for each of the multiple points along a motion path. For example, the measured rotational rates may be integrated once to produce orientation angles, and the measured linear acceleration may be integrated twice to produce position. The position of each of the multiple points along the motion path may be computed for each axis, as shown in equations 1 and 2.

$$\vec{v} = \vec{v}_0 + \vec{a}_m (\Delta t) \qquad \text{Eqn 1.}$$

$$\vec{p} = \vec{p}_0 + \vec{v}_0 (\Delta t) + \frac{1}{2} \vec{a}_m (\Delta t)^2. \qquad \text{Eqn 2}$$

In equations 1 and 2, the vectors, $\vec{p}$, $\vec{v}$, and $\vec{a}_m$ represent the computed position, computed velocity, and measured acceleration, respectively, $\vec{p}_0$ represents the previous position vector, $\vec{v}_0$ represents the previous velocity vector, and $\Delta t$ represents the change in time from the previous measurement The positions generated using equations 1 and 2 are defined in a Cartesian reference frame of the measurement sensors within the portable device 102, and may be transformed into the local coordinate system of the portable device 102 using a transform (such as a 4×4 homogeneous transformation matrix) that defines the position and orientation difference between the sensor and the local coordinate system of the portable device 102. In a particular embodiment, the positioning instructions 116 may include instructions to transform the positions in the relative (local) coordinate system into positions within a second coordinate system (i.e., a world coordinate system) using pre-multiplication of the change in relative position vector ($\vec{p}$) by a rotation matrix, as shown in equations 3 and 4.

$$\Delta \vec{p} = \vec{p} - \vec{p}_0 \qquad \text{Eqn 3.}$$

$$\begin{bmatrix} \Delta P_x \\ \Delta P_y \\ \Delta P_z \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} \Delta p_x \\ \Delta p_y \\ \Delta p_z \end{bmatrix}. \qquad \text{Eqn 4}$$

In equation 4, the elements $\Delta P_i$ (uppercase P) are the x, y, and z components of the position defined in the second coordinate system. In the rotation matrix $[r_{11} \ldots r_{33}]$, the variables $r_{11}$-$r_{33}$ represent individual elements of the 3×3 rotation matrix. The positioning instructions 114 may include instructions executable by the processor 104 to generate the rotation matrix $[r_{11} \ldots r_{33}]$. In a particular embodiment, the positioning instructions 116 may use attitude and heading reference system (AHRS) algorithms to generate the position information based on the acceleration data 114. Positioning systems that determine positions using only equations 1-4 are said to use an open-loop approach because the positions determined in equations 1 and 2 are transformed into positions within a real world coordinate (e.g., using equations 3 and 4) with reference a single known location (e.g., a starting location) in the second coordinate system.

As shown in FIG. 1, drift correction instructions 118 may be stored in the memory 106 of the portable device 102. The drift correction instructions 118 may be executable by the processor 104 to adjust or correct errors in the positions determined using the positioning instructions 116. In a particular embodiment, the errors may be caused by drift as described with reference to FIGS. 2 and 3. The drift correction instructions 118 may include instructions to determine an acceleration offset vector ($\vec{\epsilon}\,'$) to be applied to the measured acceleration vector ($\vec{a}_m$). The acceleration offset vector ($\vec{\epsilon}$) may account for the error caused by the drift, where the resulting acceleration vector ($\vec{a}_{m+\epsilon}$) is a function, such as a sum, of the measured acceleration vector ($\vec{a}_m$) and the acceleration offset vector ($\vec{\epsilon}$).

For example, the drift correction instructions 118 may include instructions to determine the position of each of the multiple points along the motion path based on the acceleration data 113 and the acceleration offset vector ($\vec{\epsilon}$), as shown equations 5 and 6.

$$\vec{v} = \vec{v}_0 + \vec{a}_{m+\epsilon} (\Delta t) \qquad \text{Eqn 5.}$$

$$\vec{p} = \vec{p}_0 + \vec{v}_0 (\Delta t) + \frac{1}{2} \vec{a}_{m+\epsilon} (\Delta t)^2. \qquad \text{Eqn 6}$$

In equations 5 and 6, the vectors, $\vec{p}$, $\vec{v}$, and $\vec{a}_{m+\epsilon}$ represent computed positions, computed velocities, and measured accelerations, respectively, that have been corrected to account for errors caused by drift using and the acceleration offset vector ($\vec{\epsilon}$). In equations 5 and 6, $\vec{p}_0$ represents the previous position vector, $\vec{v}_0$ represents the previous velocity vector, and $\Delta t$ represents the change in time from the previous measurement.

The positions generated using equations 5 and 6 may be defined in the local coordinate system of the portable device 102. In a particular embodiment, the drift correction instructions 118 may include instructions to transform the positions in a local coordinate system into positions within a second coordinate system using pre-multiplication of the change in relative position vector ($\vec{p}$) by a rotation matrix, as shown in equations 7 and 8.

$$\Delta \vec{p}_c = \vec{p}_c - \vec{p}_{c0} \qquad \text{Eqn 7.}$$

$$\begin{bmatrix} \Delta P_x \\ \Delta P_y \\ \Delta P_z \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} \Delta p_{cx} \\ \Delta p_{cy} \\ \Delta p_{cz} \end{bmatrix}. \qquad \text{Eqn 8}$$

Equations 7 and 8, have the same form as equations 3 and 4, except that equations 7 and 8 use positions that have been corrected (as denoted by the subscript "c") to account for errors caused by drift using and the acceleration offset vector ($\vec{\epsilon}$) using equations 5 and 6.

In another embodiment, the drift correction instructions 118 may generate the corrected positions using equations 5 and 6 and the corrected positions may then be transformed into positions in the second coordinate system using the positioning instructions 116 (e.g., using equations 3 and 4). In another embodiment, the drift correction instructions 118 may be included with the positioning instructions 116.

In an embodiment, the drift correction instructions 118 may include instructions to determine the acceleration offset vector ($\vec{\epsilon}$). In an embodiment, the acceleration offset vector ($\vec{\epsilon}$) may be determined using a loop-closure approach (in contrast to the open-loop approach described above) in which position and acceleration information corresponding to the starting location and to an ending location of the motion path are known. For example, prior to beginning to travel along the motion path from the starting location to the end location, the measured linear acceleration may be zeroed. When the portable device 102 arrives at the ending location, the measured linear acceleration of the portable device 102 should be zero (although the measured acceleration may be non-zero due to drift). In an embodiment, the loop-closure approach may use an iterative root-finding technique to determine the acceleration offset vector ($\vec{\epsilon}$). The loop-closure approach may minimize a difference between an estimated ending position (e.g., a position estimate calculated using the measurement data 114, the acceleration offset vector ($\vec{\epsilon}$)) and the known ending position. In an embodiment, the loop-closure approach may iteratively determine the acceleration offset vector ($\vec{\epsilon}$) until the difference between the estimated ending position and the known ending position is within a threshold distance. In another embodiment, the loop-closure approach may iteratively determine the acceleration offset vector ($\vec{\epsilon}$) until the difference between the estimated ending position and the known ending position is zero.

In one embodiment, a root-finding technique such as the finite difference version of the Newton-Raphson method (sometimes refereed to as the secant method) may be used to iteratively determine the acceleration offset vector ($\vec{\epsilon}$). This method uses first order terms of a Taylor series to find a candidate input that will minimize (i.e., find the root of) a function. For each iteration of the loop-closure approach, a candidate acceleration offset vector ($\vec{\epsilon}$) may be computed based on prior solutions to the function. The loop-closure approach may perform the iteration process multiple times to successively refine the candidate acceleration offset vector ($\vec{\epsilon}$) until a desired accuracy of the solution is reached (e.g., the difference between the estimated ending position and the known ending position is within the threshold distance). An example of a finite difference formulation that may be used by the loop-closure approach to determine a next candidate acceleration offset vector ($\vec{\epsilon}$) is shown in equation 9:

$$\vec{\epsilon}_{n+1} = \vec{\epsilon}_n - \vec{P}_n(\vec{\epsilon}_n - \vec{\epsilon}_{n-1})/(\vec{P}_n - \vec{P}_{n-1}) \qquad \text{Eqn 9.}$$

In equation 9, $\vec{\epsilon}_{n+1}$ represents a next candidate offset vector, $\vec{\epsilon}_n$ represents a current candidate acceleration offset vector, $\vec{\epsilon}_{n-1}$ represents a previous candidate acceleration offset vector, $\vec{P}_n$ represents the current position vector, and $\vec{P}_{n-1}$ represents the previous position vector.

In an embodiment, the finite difference formulation may not have enough prior data (e.g., prior candidate acceleration offset vector ($\vec{\epsilon}$)) to begin the formulation. Thus, the drift correction instructions 118 may include instructions to determine an initial offset vector ($\vec{\epsilon}$). In a particular embodiment, the initial offset vector ($\vec{\epsilon}$) may be determined based on a difference between the measured acceleration at the starting location and the measured acceleration at the ending location, divided by the number of acceleration measurements made. For example, assume the measured acceleration at the starting location is $\vec{a}_s$, the measured acceleration at the ending location is $\vec{a}_e$, and the total number of acceleration measurements is n, the initial offset vector ($\vec{\epsilon}$) may be determined by equation 10:

$$\vec{\epsilon} = (\vec{a}_e - \vec{a}_s)/n \qquad \text{Eqn 10.}$$

In another embodiment, the initial offset vector ($\vec{\epsilon}$) and additional candidate acceleration offset vector ($\vec{\epsilon}$), may be determined using an exhaustive search, a golden section search, a bisection method, or another root finding technique. In yet another embodiment, the initial offset vector ($\vec{\epsilon}$) may be determined based on an offset vector ($\vec{\epsilon}$) that was determined during a previous use of the portable device 102 or based on a distance between the position of the known ending location and the position the ending position determined based on the acceleration data 114.

In another embodiment, the acceleration offset vector ($\vec{\epsilon}$) may be determined based on a function that varies with time, $\vec{\epsilon}(t)$. Linear acceleration data and rotational rate data at the intermediate locations between the known beginning and ending locations may be used by the function to determine the acceleration offset vector ($\vec{\epsilon}$). For example, if the acceleration and velocity at one or more intermediate locations on the motion path are known, a curve fitting method may be used. In an embodiment, a single order polynomial may be used to determine the time varying acceleration offset vector, $\vec{\epsilon}(t)$.

In other embodiments, a higher order polynomial may be used to determine the time varying acceleration offset vector, $\vec{\epsilon}(t)$.

In an embodiment, the portable device 102 may include a location database 120. The location database 120 may store positioning information descriptive of known locations. For example, the positioning information may include position and orientation data from a 3D CAD model, global positioning system (GPS) coordinates, a longitude and latitude, or other information descriptive of the position and orientation of the known locations. In an embodiment, the positioning information may be used by the drift correction instructions 118 to correct errors in the positions and orientation determined using the positioning instructions 116, as described with reference to FIGS. 2-6. In an embodiment, the location database 120 may be stored in the memory 106. In another embodiment, the location database 120 may be stored at a storage that is external to the portable device 102 and may be accessible to the processor 104 via an I/O interface 122.

In an embodiment, the I/O interface 122 may couple the processor 104 to a display device (not shown) for presenting information to a user. In a particular embodiment, the information may be related to a specific measured position, the estimated position error, the measurement data 114, the motion path determined using the measurement data 114 and the positioning instructions 116, the corrected motion path determined using the drift correction instructions 118, or any combination thereof. In an embodiment, a user interface may be presented at the display device via I/O interface 122. In a particular embodiment, the display device may be integrated within the portable device 102. In another particular embodiment, the display device may be external to the portable device 102. In an embodiment, one or more software applications (e.g., a 3D graphics visualization application) may be stored as instructions at the memory 106, and may be used to display information associated with the motion path determined using the measurement data 114 and the positioning instructions 116, the corrected motion path determined using the drift correction instructions 118, or both.

In an embodiment, the I/O interface 122 may couple the processor 104 to an input device (not shown) for providing input to the portable device 102. For example, a user may use a graphical interface to input location information into, or to retrieve location information from the location database 120, as described with reference to FIG. 7. As another example, after displaying the motion path determined using the measurement data 114 and the positioning instructions 116, the user may request display of the corrected motion path determined using the drift correction instructions 118. In an embodiment, a user may provide an input to the portable device 102 via the I/O interface 122 to indicate when the portable device 102 is located at the starting location, the ending location, or both.

Figure 2:
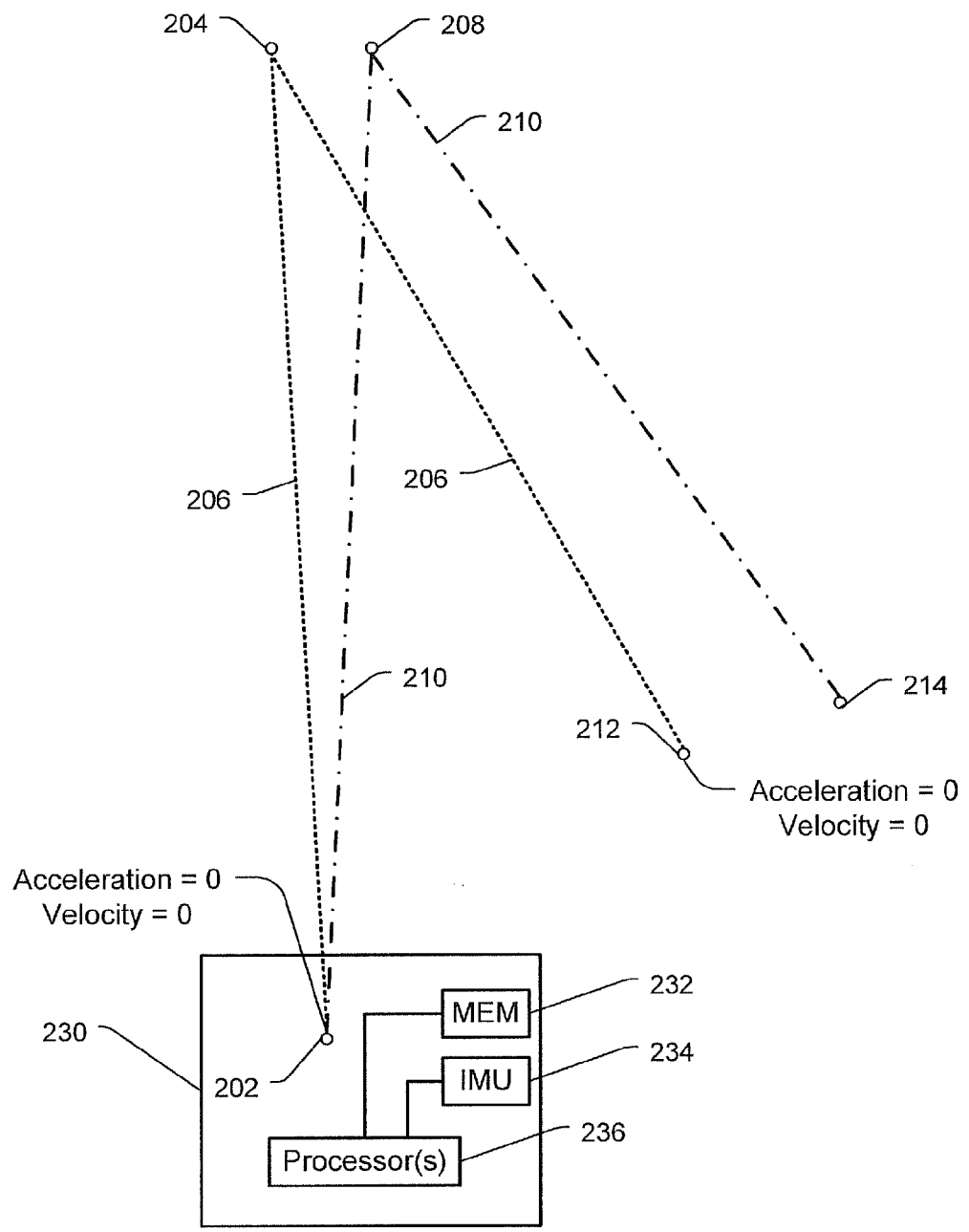
FIG. 2 is an illustration of an embodiment of using a position measurement system to determine a motion path.

Referring to FIG. 2, an illustration of an embodiment of using a local positioning system to determine a motion path is shown. In FIG. 2, a portable device 230 is shown. In a particular embodiment, the portable device 230 may be the portable device 102 of FIG. 1. In a particular embodiment, the portable device 230 may include a processor 236, an inertial measurement unit (IMU) 234, and a memory 232. In an embodiment, the processor 236 may be the processor 104 described with reference to FIG. 1, the IMU 234 may be the IMU 106 described with reference to FIG. 1, and the memory 232 may be the memory 106 described with reference to FIG. 1. In a particular embodiment, the IMU 234 may include one or more accelerometers (e.g. the accelerometers 110 of FIG. 1) and gyroscopes (e.g. the gyroscopes 112 of FIG. 1). As the portable device 230 is moved along a motion path, the IMU 234 may measure linear acceleration and rotational rates at multiple points along the motion path. In an embodiment, the measured linear acceleration and the measured rotational rates may be provided from the IMU 234 to the processor 236, and then stored by the processor 236 as acceleration and rotational data (e.g., the measurement data 114 of FIG. 1) in the memory 232. In a particular embodiment, the IMU 234 may include one or more magnetometers (not shown) for measuring magnetic fields. The measured magnetic field data may be stored with the measurement data in the memory 232.

The processor 236 may use the measurement data to compute a position for each of the multiple points along the motion path for which acceleration and rotational data has been stored in the memory 232. In an embodiment, the processor 236 may determine the positions along the motion path using positioning instructions (e.g., the positioning instructions 116 described with reference to FIG. 1). To illustrate, the portable device 230 may be moved to a starting location 202. The starting location 202 may have a known position and orientation within a coordinate system (e.g., a real world coordinate system). Alternatively, the starting location 202 may be designated an origin position within a local coordinate system of the portable device 230. In an embodiment, the known position may be determined using a location database (e.g., the location database 120 of FIG. 1). In another embodiment, the known position may be determined using another positioning system, such as a global positioning system (GPS) or a local positioning system. Positioning data descriptive of the known position and orientation of the starting location may be stored at the memory 232 of the portable device 230. While the portable device 230 is at the starting location, the one or more accelerometers and the gyroscopes of the IMU 234 may be initialized to zero (i.e., zero acceleration, zero rotation, and zero velocity).

After initializing the IMU 234 to zero and storing the positioning data, the portable device 230 may be moved along a motion path 206 from the starting location 202 to an intermediate location 204. It should be understood that the motion path 206 is shown as a linear path for simplicity of description only and that the embodiments described herein may utilize non-linear paths and should not be limited to linear paths. As the portable device 230 travels from the starting location 202 to the intermediate location 204, the IMU 234 may take linear acceleration and rotational rate measurements at multiple points along the motion path 206. The measurements may be stored as measurement data (e.g., acceleration and rotational data) in memory 232.

In an embodiment, the portable device 230 may receive an input while generating and storing the measurement data (e.g., the measurement data 114). The input may indicate that the portable device 230 has reached the intermediate location 204. In an embodiment, the input may be received via a user interface. In an embodiment, the input is received automatically when the portable device 230 is detected to have stopped for a defined period (e.g., one (1) second or more) before continuing to travel along the motion path 206 from the intermediate location 204 to an ending location 212. While traveling along the motion path 206 from the intermediate location 204 to the ending location 212, the IMU 234 may generate additional acceleration and rotational data. The additional acceleration and rotational data may be stored as measurement data (e.g., the measurement data 114) at the memory 232. In an embodiment, the ending location 212 may be a different location than the starting location 202, as shown in FIG. 2. In another embodiment, the ending location 212 and the starting location 202 may be the same location. Additionally, while only one intermediate location (e.g., the intermediate location 204) is shown in FIG. 2, other embodiments may use more than one intermediate location.

In FIG. 2, the motion path 206 may correspond to an actual motion path of the portable device 230 as the portable device 230 travels from the starting location 202 to the intermediate location 204 and then to the ending location 212. The portable device 230 may calculate positions corresponding to a measured motion path 210 based on the measurement data stored in the memory 232. For example, the memory 232 may include positioning instructions (e.g., the positioning instructions 116 of FIG. 1) executable by the processor 236 to transform the measurement data into one or more positions in a coordinate system (e.g., the real world coordinate system or the local coordinate system).

The positions generated using the positioning instructions without correcting for drift may indicate that the portable device 230 travelled along the measured motion path 210 rather than the motion path 206. As shown in FIG. 2 and described with reference to FIG. 3A, the effects of the acceleration drift may cause the positions computed using the positioning instructions (e.g., equations 1-4) to diverge from the actual path of travel (e.g., the motion path 206). Thus, when the portable device 230 was actually located at the intermediate location 204, the measured motion path 210 may indicate that the portable device 230 was located at a measured intermediate location 208. Additionally, when the portable device 230 was actually located at the ending location 212, the measured motion path 210 may indicate that the portable device 230 was located at a measured ending location 214. Although the measured motion path 210 is illustrated as a linear path, the measured path is not necessarily linear. Rather, the measured motion path 210 is intended to illustrate that measurement error exits between the actual path traveled by the portable device 230 (e.g., the motion path 206) and the measured motion path 210 of the portable device 230. Additionally, the measured motion path 210 is intended to illustrate that uncertainty in the measured motion path 210 increases over time.

Figure 3A:
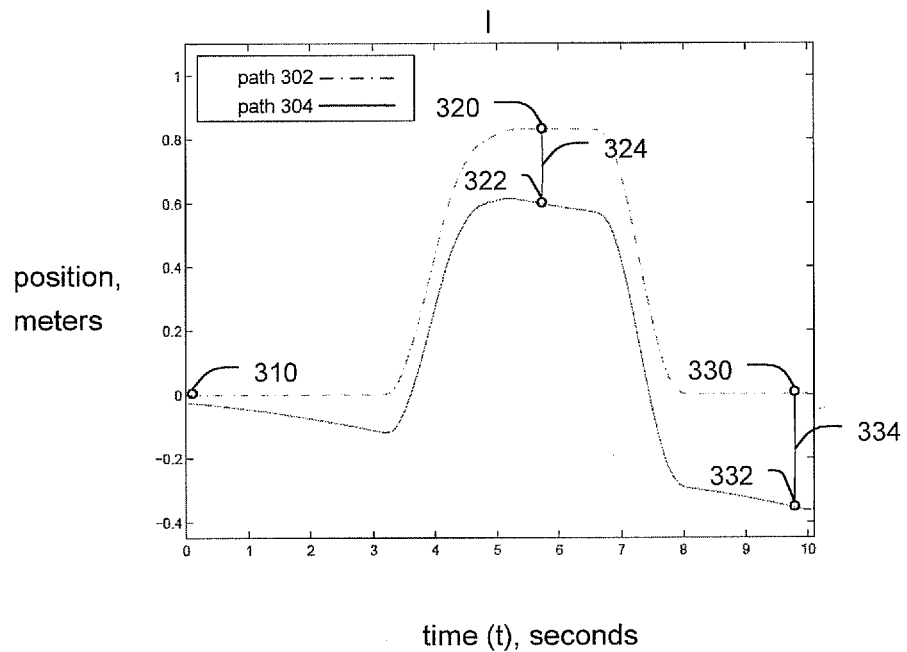
FIGS. 3A and 3B illustrate position data acquired using a first position measurement device and a second position measurement device.

To illustrate, referring to FIG. 3A, position data acquired using two different position measurement devices is shown. The two different measurement devices include a motion capture (MoCap) system, known to provide accurate position data, and an IMU device (e.g., the portable device 230). In FIG. 3A, the actual path 302 is shown as a dot/dashed line, and a measured path 304 is shown as a solid line. The actual path 302 corresponds to positions determined based on measurements collected by the MoCap system, and the measured path 304 corresponds to positions determined based on measurements collected by the IMU device. For purposes of illustration, the actual path 302 may correspond to the motion path 206 of FIG. 2 and the measured path 304 may correspond to the measured motion path 210 of FIG. 2. To more precisely match the motion paths 302, 304 illustrated in FIG. 3A, the portable device 230 may be moved from the starting location 202 (e.g., position 310 of FIG. 3A), to the intermediate location 204 (e.g., position 320 of FIG. 3A), and to the ending location 212 (e.g., position 330 of FIG. 3A).

The paths 302 and 304 plot positions based on measurements taken by the MoCap system and the IMU device, respectively, as the devices travelled along a single path (e.g., the path 206) from a first location 310 (e.g., the starting location 202) to a second location 320 (e.g., the intermediate location 204) and then to a third location 330 (e.g., the ending location 212). In the experimental setup, motion was linear, along a single axis (for simplicity) and the starting location and ending location were the same. As shown in FIG. 3A, the measured path 304 drifts or diverges from the actual path 302. Thus, the measured path 304 indicated by the positions calculated using the IMU device is not representative of the actual path 302 of travel taken by the IMU device.

As shown in FIG. 3A, error between the measure path 304 and the actual path 302 may increase over time. For example, the paths 302, 304 begin at a same location 310 at time (t)=0 seconds. When t=6 seconds, a difference 324 between point 320 on the actual path 302 and point 322 on the measured path 304 is approximately one-fourth (0.25) meter. When t=10 seconds, a difference 334 between point 330 on the actual path 302 and point 332 on the measured path 304 is approximately three-eighths (0.375) meter. As is also illustrated by FIG. 3A, the difference between the actual path 302 and the measured path 304 may not be easily predictable (e.g., linear).

In an illustrative example, time t=0 may correspond to a first time when the portable device 230 of FIG. 2 was located at the starting location 202, time t=6 may correspond to a second time when the portable device 230 was located at the intermediate location 204, and time t=10 may correspond to a third time when the portable device 230 was located at the ending location 212. When t=0, a difference between the path 206 and the measured path 210 may be zero (0) meters. When t=6, a difference between the path 206 and the measured path 210 may be approximately one-fourth (0.25) meter. When t=10, a difference between the path 206 and the measured path 210 may be approximately three-eighths (0.375) meter. Thus, the difference between the intermediate location 204 and the intermediate location 208 may be approximately one-fourth (0.25) meter and a difference between the ending location 212 and the ending location 214 may be approximately three-eighths (0.375) meter. Some uses of the portable device 230 may be able to tolerate these differences while other uses may require a higher degree of accuracy.

Figure 3B:
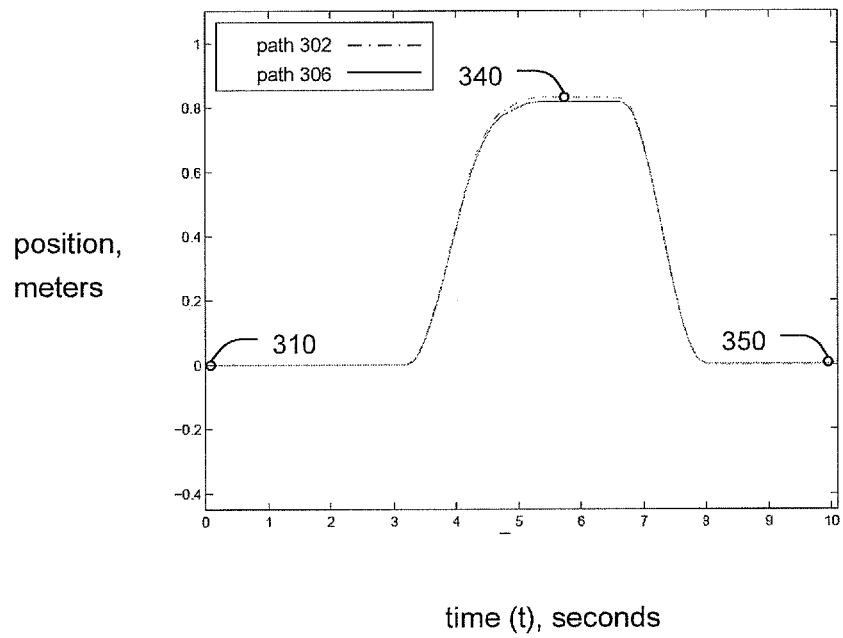

To achieve a higher degree of accuracy, the portable device 230 may apply a drift correction algorithm to the acceleration data stored at the memory 232, such as the loop-closure approach described with reference to FIG. 1 and described further with reference to FIGS. 5 and 6. The loop-closure approach to drift correction may reduce the difference between the path 206 and the measured path 210. In a particular embodiment, the drift correction algorithm may correspond to the drift correction instructions 118 described with reference to FIG. 1 and with further reference to FIGS. 4-6. To illustrate, referring to FIG. 3B, the loop-closure approach described with reference to FIG. 1 has been applied to the acceleration measurements corresponding to the positions of the path 304 (i.e., the measurements taken by the IMU device). The path 306 was generated by plotting data points corresponding to positions generated by applying an offset value (e.g., the acceleration offset value ($\vec{\epsilon}$) described with reference to FIG. 1) to the acceleration measurements corresponding to the path 304 (i.e., the position measurement data generated by the IMU device). As shown in FIG. 3B, the loop-closure approach may reduce error between the path 302 and the path 306. As shown in FIG. 3B, the actual positions and the corrected measured positions are in the same place. For example, the positions 320 and 322, corresponding to the intermediate location, are both at position 340, and positions 330 and 332, corresponding to the ending location, are both at position 350. Experiments have shown that the loop-closure approach may reduce positioning errors caused by drift to within a one percent (1%) margin of error in a determined position of a location along the motion path (e.g., the motion path 306) when compared to the actual motion path (e.g., the motion path 302).

Figure 4:
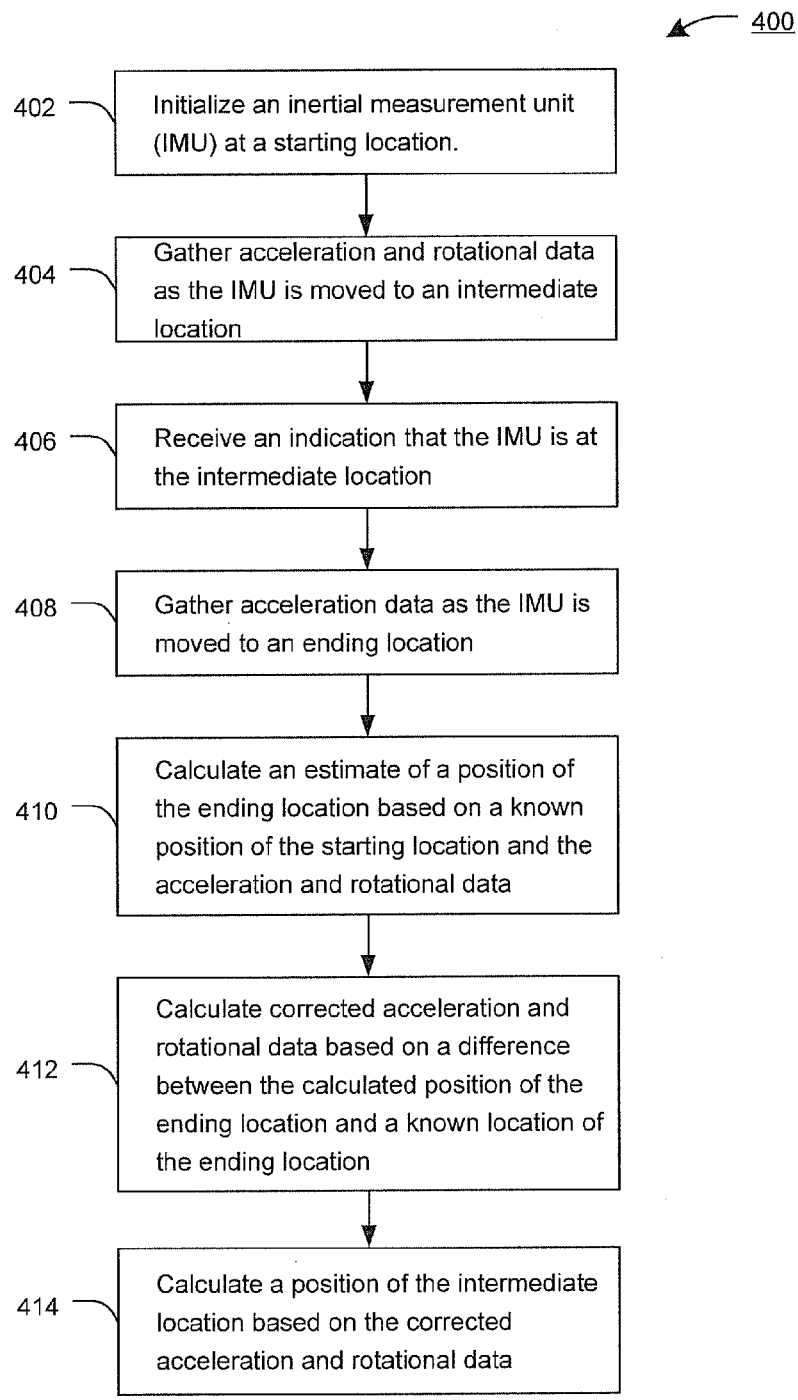
FIG. 4 is a flow chart of a method of determining a position of an unknown location within a coordinate system.

Referring to FIG. 4, a flow chart of a method of determining a position of an unknown location within a coordinate system is shown and designated 400. The method 400 includes, at 402, initializing an inertial measurement unit (IMU) of a portable device (e.g., the portable device 102 of FIG. 1 or the portable device 230 of FIG. 2) at a starting location (e.g., the starting location 202 of FIG. 2.). In a particular embodiment, the IMU may be incorporated into an electronic device, such as the portable device 102 of FIG. 1 or the portable device 230 of FIG. 2. In a particular embodiment, the IMU device may be initialized to zero (e.g., zero acceleration, zero rotation, and zero velocity) when the electronic device is at the starting location. At 404, the method 400 includes gathering acceleration and rotational data as the IMU is moved along a motion path (e.g., the motion path 206 of FIG. 2) to an intermediate location (e.g., the intermediate location 204 of FIG. 2.) and, at 406, receiving an indication that the IMU is at the intermediate location. In an embodiment, the indication may be received via a graphical user interface as described with reference to FIG. 1. In another embodiment, the indication may be generated periodically by the electronic device (e.g., the portable device 102 or the portable device 230). In a particular embodiment, the indication that the IMU is at the intermediate location is received while the IMU is stationary at the intermediate location (e.g., zero acceleration, zero rotation, and zero velocity).

At 408, the method 400 includes gathering additional acceleration and rotational data as the IMU is moved along the motion path from the intermediate location to an ending location (e.g., the ending location 212 of FIG. 2.). An indication may be provided to the IMU when the IMU is stationary at the ending location. The method includes, at 410, calculating an estimate of a position of the ending location based on a known position of the starting location and the acceleration and rotational data and, at 412, calculating corrected acceleration data based on a difference between the estimated position of the ending location and a known location of the ending location. In a particular embodiment, calculating corrected acceleration data may include determining an acceleration offset value for each motion axis (e.g., the acceleration offset vector) described with reference to FIG. 1) and applying the acceleration offset value to each measurement included in the acceleration data gathered by the IMU. In a particular embodiment, the acceleration data gathered by the IMU may be used to calculate positions within a first coordinate system (e.g., a coordinate system local to the IMU) (e.g., using equations 1 and 2 of the positioning instructions 116). The known location of the ending location may be in a second coordinate system (e.g., a real world coordinate system). In an embodiment, the method may include transforming the positions within the first coordinate system into positions within the second coordinate system (e.g., using equations 3 and 4 of the positioning instructions 116) using the rotational data prior to calculating the corrected acceleration data. In an embodiment, the corrected acceleration data may be calculated using a loop-closure approach that may utilize the drift correction instructions 118 as described with reference to FIGS. 1 and 2.

At 414, the method includes calculating a position of the intermediate location (in one, two, or three dimensions) based on the corrected acceleration data. In a particular embodiment, the position of the intermediate location calculated based on the corrected acceleration data, as described with reference to FIG. 3B, may be more precise than the position of the intermediate location calculated based on the measured acceleration data alone, as described with reference to FIG. 3A.

Figure 5:
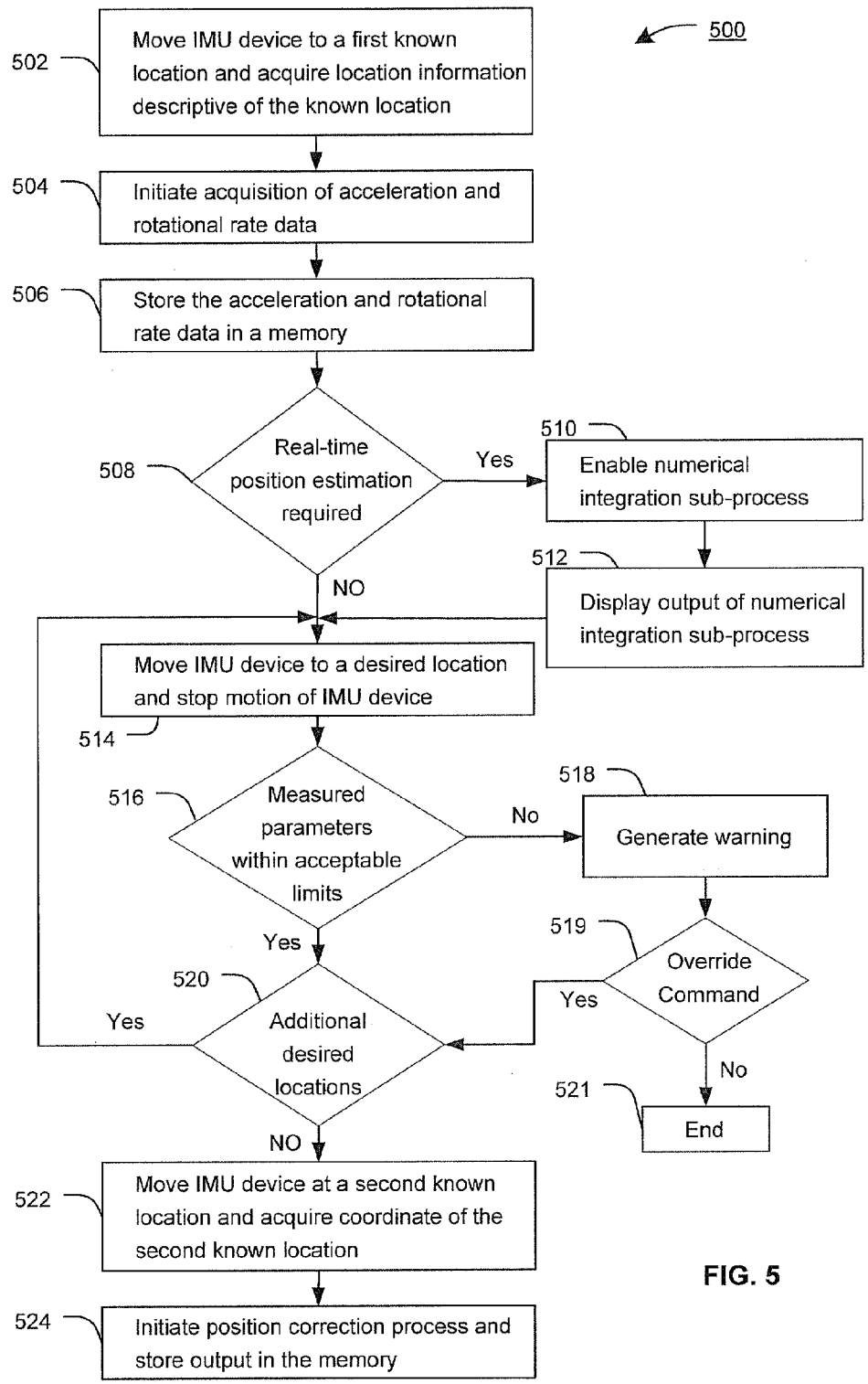
FIG. 5 is a flow chart of another method of determining a position of an unknown location within a coordinate system.

Referring to FIG. 5, a flow chart of a method of determining a position of an unknown location within a coordinate system is shown and designated 500. The method 500 includes, at 502, moving an inertial measurement unit (IMU) device (e.g., the portable device 102 of FIG. 1 or the portable device 230 of FIG. 2) to a first known location and acquiring location information descriptive of the known location (e.g., 3D CAD coordinates, global positioning system (GPS) coordinates, a longitude and a latitude, local coordinate system coordinates). The IMU device may be initialized to zero at the known location (e.g., acceleration, rotation, and velocity set to zero). At 504, the method 500 includes initiating acquisition of acceleration data and rotational data. In a particular embodiment, the IMU device may include one or more accelerometers and gyroscopes to detect movement of the IMU device. The acceleration data and the rotational data may be generated by the accelerometers and the gyroscopes in response to detecting the movement of the IMU device. The acceleration data and the rotational data may be stored at a memory of the IMU device (e.g., the memory 106 of FIG. 1 or the memory 232 of FIG. 2), at 506.

At 508, the method 500 includes determining whether real-time position estimation is required (e.g., requested by a user). When real-time position estimation is required, the method 500 may include, at 510, enabling a numerical integration sub-process. In an embodiment, the numerical integration sub-process may determine position and orientation data based on the acceleration data and the rotational data generated by the accelerometers in real-time (e.g., using the positioning instructions 116 of FIG. 1). In a particular embodiment, the real-time position estimates may not be corrected to account for drift using the loop-closure method (e.g., the drift correction instructions 118). At 512, the method 500 includes displaying the position and orientation data generated by the numerical integration sub-process at a display device coupled to, or integrated with the IMU device. When real-time position estimation is not required, or after the position and orientation data has been displayed at the display device, the method 500 may include, at 514, moving the IMU device to a desired location and stopping the motion of the IMU device. In a particular embodiment, the desired location may be the intermediate location 204. Moving the IMU device to the desired location may correspond to moving the portable device 230 from the starting location 202 to the intermediate location 204 as described with reference to FIG. 2. When the IMU device is at the desired location, the motion of the IMU device may be stopped.

At 516, the method 500 may include determining whether the acceleration data and the rotational data are within acceptable limits. For example, an error condition may be detected, such as an acceleration or rotation rate saturation event (e.g. bumping the device against something or rotating it too fast) or error estimate may be determined as the IMU is moved from the starting location to the ending location (e.g., based on an amount of time required to move the IMU). When the acceleration data and the rotational data are not within acceptable limits, the method 500 includes, at 518, generating a warning. The notification may include an audible output, a visual output, a haptic output, or a combination thereof, from a device that includes the IMU. At 519, the method 500 may include determining whether an override command has been received (e.g., based on input from the user). In response to a determination that the override command was not received, the method 500 may terminate, at 521. In response to a determination that the override command was received, or when the acceleration data and the rotational data are within acceptable limits, the method 500 may include, at 520, determining whether the IMU device is to be moved to an additional desired location (i.e., an additional intermediate location). If the IMU device is to be moved to an additional desired location, the method 500 includes, at 514, moving the IMU device to a next desired location and stopping motion of the IMU device. If no additional desired locations exist, the method 500 includes, at 522, moving the IMU device to a second known location (e.g., the ending location 212 of FIG. 2) and acquiring location information descriptive of the second known location. After arriving at the second known location, motion of the IMU device may be stopped and the IMU device may stop generating acceleration and rotational data.

At 524, the method 500 includes initiating a position correction process and storing an output of the position correction process in the memory of the IMU device. An exemplary position correction process is described with reference to FIG. 6. In a particular embodiment, the position correction process may be stored as instructions in a memory (e.g., the drift correction instructions 118). In an embodiment, the method may include displaying a corrected motion path on a display device coupled to the IMU device. In an embodiment, position information descriptive of the intermediate location may be displayed or stored in memory of the device. In another embodiment, the method may include estimating a confidence interval associated with the position information descriptive of the intermediate location. The confidence interval may indicate an estimate of the accuracy of the position information.

Figure 6:
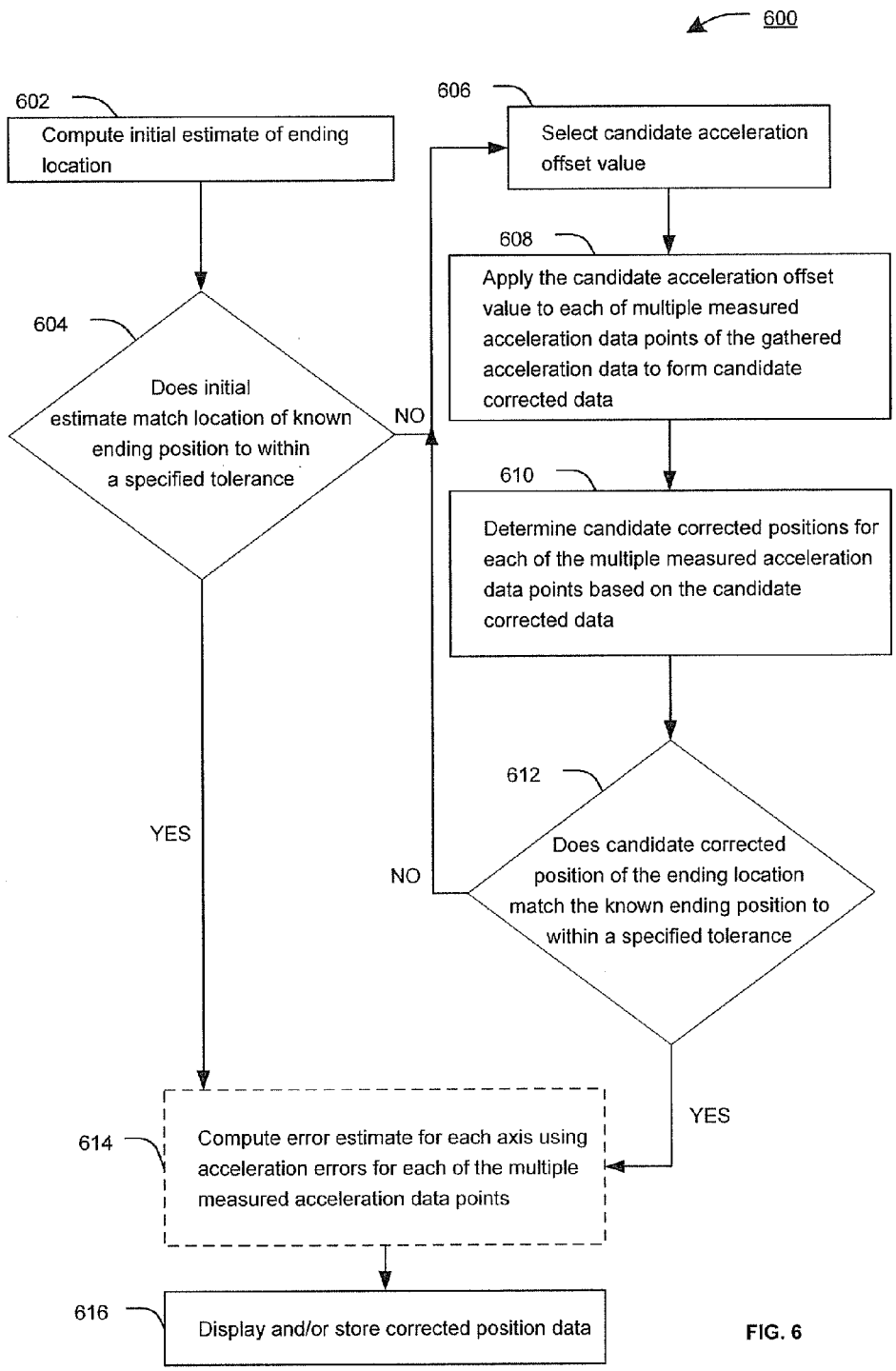
FIG. 6 is a flow chart of another method of determining a position of an unknown location within a coordinate system.

Referring to FIG. 6, a flow chart of a method of determining a position of an unknown location in a coordinate system is shown and designated 600. In a particular embodiment, the method 600 may be performed using a portable device that includes an inertial measurement unit (IMU), such as the portable device 120 of FIG. 1 or the portable device 230 of FIG. 2. The method 600 describes using measurement data (e.g., the measurement data 114) determined with respect to one motion axis. In other embodiments, measurement data determined with respect to more than one motion axis may be used.

The method 600 includes, at 602, computing an initial estimate of a position of the ending location. In an embodiment, the initial estimate of the position of the ending location may be computed using double integration of the measured acceleration data, as described with reference to FIG. 1 and equations 1-4. At 604, the method 600 includes determining whether the initial estimate of the position of the ending location matches a known ending position to within a specified tolerance. In an embodiment, when the initial estimate of the position of the ending location matches the known ending position to within the specified tolerance, the method 600 includes, at 614, computing an error estimate for each axis using acceleration errors for each of multiple measured acceleration data points of the measured acceleration data. In an embodiment, the error estimate may be a confidence interval, such as the confidence interval described with reference to FIG. 5. At 616, the method 600 includes displaying the position of the ending location and/or storing the position of the ending location in a memory (e.g., the memory 106 or the memory 232). In an embodiment, the specified tolerance may be adjustable based on accuracy requirements for a desired application of the portable device.

In an embodiment, when the initial estimate of the position of the ending location does not match the known ending position to within the specified tolerance, the method 600 includes, at 606, selecting an initial candidate acceleration offset value (e.g., an axis of the acceleration offset vector $\vec{\epsilon}$). In an embodiment, the initial candidate acceleration offset value may be determined using the drift correction instructions 118 described with reference to FIG. 1. For example, the acceleration data corresponding to a measured acceleration (e.g., $a_s$) at the beginning location may indicate zero (0) acceleration because the IMU was initialized to zero (0). Although the motion of the IMU device was stopped when the IMU device arrived at the ending location (e.g., the ending location 212), the acceleration data corresponding to the ending location may indicate a non-zero acceleration (e.g., $a_e$) due to acceleration drift. In an embodiment, the initial candidate acceleration offset value may be determined based on a difference between the acceleration data as measured by the IMU device at the beginning location and the ending location. For example, the initial candidate acceleration offset value may be determined using equation 10 described with reference to FIG. 1.

At 608, the method 600 includes applying the candidate acceleration offset value to each of the multiple measured acceleration data points of the gathered acceleration data. In an embodiment, applying the candidate acceleration offset value to each of the multiple measured acceleration data points produces a sequence of adjusted acceleration data points (i.e., candidate corrected data). The candidate corrected data may be used to produce a sequence of new position estimates (i.e., candidate corrected positions) for the motion path. In a particular embodiment, the candidate acceleration offset value may be applied to each of the multiple measured acceleration data points (e.g., using the drift correction instructions 118). For example, the candidate acceleration offset value (e.g., a value of the offset vector ($\vec{\epsilon}$)) may be applied to each of the multiple measured acceleration data points as part of the double integration process of equations 5 and 6. At 610, the method 600 includes determining candidate corrected positions for each of the multiple measured acceleration data points to produce candidate corrected positions. In a particular embodiment, the candidate corrected positions may be determined for each of the multiple measured acceleration data points along the motion path using the drift correction instructions 118. For example, the candidate corrected calculated positions may be determined using equations 6-10. In another embodiment, the candidate corrected positions may be determined for each of the multiple measured acceleration data points along the motion path using the positioning instructions 116 and the drift correction instructions 118. For example, the candidate corrected data may be determined using equation 5 and 6 and the candidate corrected positions may be determined using equations 7 and 8.

At 612, the method 600 includes determining whether the candidate corrected position of the ending location matches the known ending position to within the specified tolerance. For example, referring to FIG. 2, applying the candidate acceleration offset value to the acceleration data corresponding to the measured motion path 210 may generate a new candidate ending location (not shown) that is different than the ending location 214. In an embodiment, the new candidate ending location may be closer to the known ending location 212. The portable device 230 may determine whether a distance between the new candidate ending location and the known ending location 212 is within a threshold distance. In an embodiment, the threshold distance may be one (1) centimeter, one (1) meter, one (1) inch, one (1) foot, or any measurable distance. In another embodiment, the threshold distance may be dynamic (e.g., a function of time of the measurement process). When the candidate corrected position of the ending location matches the known ending position to within the specified tolerance, the method 600 may include, at 614, computing an error estimate for each axis using acceleration errors for each of the multiple measured acceleration data points. The error estimate may be displayed on a display device. In an embodiment, the error estimate may be a confidence interval, such as the confidence interval described with reference to FIG. 5. At 616, the method 600 includes displaying the position of the ending location and/or storing the candidate corrected positions in the memory (e.g., the memory 106 or the memory 232). In an embodiment, the method 600 may include, at 616, displaying a position of an intermediate location (e.g., the intermediate location 204) and/or storing the position of the intermediate location in the memory.

At 612, when the candidate corrected position of the ending location does not match the known ending position to within the specified tolerance, the method 600 may include, at 606, selecting a new candidate acceleration offset value. In an embodiment, the new candidate acceleration offset value may be selected using the drift correction instructions 118. For example, the new candidate acceleration offset value may be selected using a loop-closure iterative approach, using a root-finding technique, such as equation 9, which may be included in the drift correction instructions 118, shown in FIG. 1. After selecting the new candidate acceleration offset value, the method 600 may proceed to execute steps 608-612 again using the new candidate acceleration offset value. Additional iterations may be performed until the candidate corrected position of the ending location matches the known ending position to within the specified tolerance.

In a particular embodiment, the loop-closure approach that utilizes the drift correction instructions 118 may result in a reduced divergence between computed positions along a motion path calculated based on the acceleration data gathered by the IMU device and positions along the actual path of travel as described with reference to FIGS. 3A and 3B. Experiments conducted using a device equipped with an IMU according to the embodiments described with reference to FIGS. 1-6 have shown that positions determined using the loop-closure drift correction process described with reference to FIGS. 1-6 are substantially more accurate than positions determined using the loop-closure approach. During these experiments, motion paths were generated based on acceleration data collected by the IMU. The motion paths were then corrected according to the embodiments described with reference FIGS. 4-6. The corrected motion paths were generated with approximately a one percent (1%) margin of error when compared to motion paths captured by a separate position measurement system with known accuracy, such as a motion capture (MoCap) system described with reference to FIGS. 3A and 3B.

Figure 7:
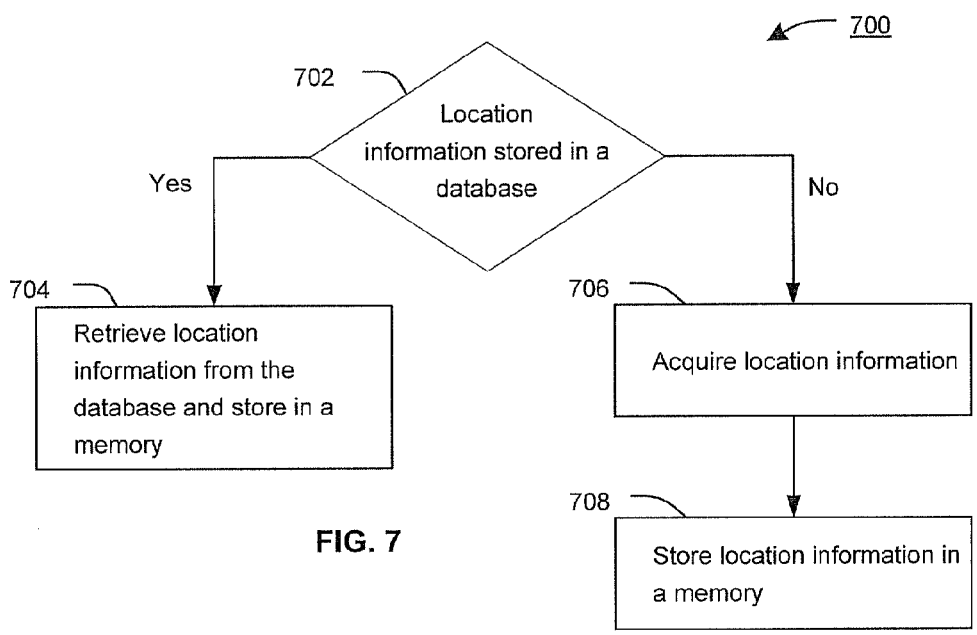
FIG. 7 is a flow chart of a method of acquiring location information for use in determining a position of an unknown location within a coordinate system.

Referring to FIG. 7, a flow chart of a method of acquiring location information for use in determining a position of an unknown location within a coordinate system is shown and designated 700. At 702, the method 700 includes determining whether location information descriptive of a location is stored in a database (e.g., the location database 120). In a particular embodiment, the database may be stored in the memory 232 of the portable device 230, and a processor 236 of the portable device 230 may determine whether the location information is stored in the memory 232. In a particular embodiment, the location may be the first known location or the second known location described with reference to FIG. 5, the starting location 202 or the ending location 212 described with reference to FIG. 2, or another location. In response to a determination that location information descriptive of the location is stored in the database, the method 700 includes retrieving the location information from the database, at 704. In response to a determination that location information descriptive of the location is not stored in the database, the method 700 includes acquiring the location information, at 706. In a particular embodiment, the location information may be acquired using a barcode, a QR code, an RFID device, a GPS system, or another system capable of providing location information to the IMU device (e.g., the portable device 230). In another particular embodiment, the location information may be acquired by sending a signal, from a device associated with the IMU device to an application at a remote computing device. The signal may include information identifying the starting location. Data indicating the known position of the starting location may be received from the application in response to the signal. In another particular embodiment, the location information may be manually entered into the IMU device. In a particular embodiment, method 700 includes, at 708, storing the acquired location information in a memory.

In an embodiment, an electronic device (e.g., the portable device 102) may calculate corrected positions along a motion path using a local coordinate system. To illustrate, the electronic device may include an IMU device that generates acceleration data (e.g., the acceleration data 114) as the electronic device is moved from a starting location to an intermediate location and then back to the starting location. The electronic device may use the starting location as a point of origin having coordinates (x,y,z) within in the local coordinate system. The electronic device may include positioning instructions (e.g., the positioning instructions 116) to calculate a position of the ending location based on the acceleration data generated by the IMU device (e.g., using equations 1 and 2). Because the starting and ending locations are the same location, the ending location calculated based on the acceleration data generated should be the same position within the local coordinate system as the starting location. However, drift may cause the calculated ending position to diverge from the starting location. The portable device may be configured to determine a corrected position of the ending location, or other positions along the motion path (e.g., the intermediate location) using a loop-closure approach that includes applying drift correction instructions (e.g., the drift correction instructions 118) to the acceleration data.

In a particular embodiment, the electronic device may be configured to output a direction and distance of the intermediate location relative to the starting location or the ending location based on the calculated corrected position. For example, the electronic device may be configured to indicate that the intermediate location is located a distance units (e.g., inches, feet, centimeters, meters) from the starting location in a first direction (e.g., an x direction in an x,y plane) and b distance units (e.g., inches, feet, centimeters, meters) from the starting location in a second direction (e.g., a y direction in the x,y plane). Other embodiments may indicate the distance units and directions in three dimensions (e.g., an x,y,z direction).

Figure 8:
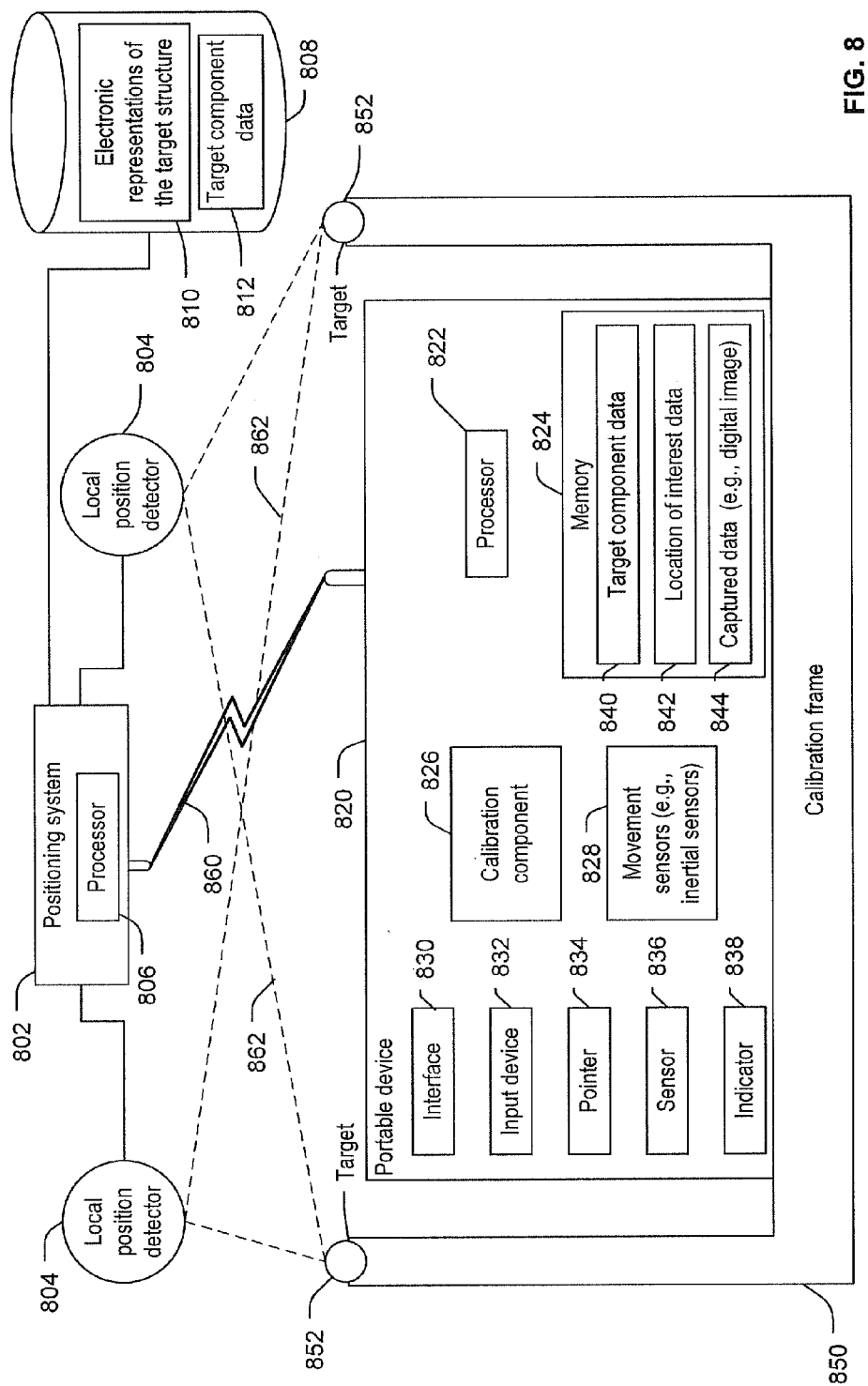
FIG. 8 is a block diagram of another embodiment of a position measurement system including a portable device.

FIG. 8 is a block diagram of a particular embodiment of a local coordinate positioning system, also known as a local positioning system. The system includes a portable device 820 that interacts with a positioning system 802. The positioning system 802 may include a local positioning system or a non-local positioning system. A local positioning system may measure locations and describe the locations in the specific coordinate system associated with an object being measured. A measurement device, such as the portable device 820, may be calibrated to the local coordinate system using reference information in the specific coordinate system, such as a survey marker or another reference point. The reference information is used to determine the relative position and orientation of the measurement device to a target structure. Local positioning systems may use optical or electromagnetic measurements sensors (e.g., laser measurement systems and the like) to make the measurements, and then transform these device-based measurements into measurements defined in the local coordinates of the target structure. A non-local positioning system may determine or specify locations relative to a reference coordinate system that is not associated with the target structure. For example, the reference coordinate system may be associated with a building or another geographic location, such as a dry dock facility. Raw output (e.g., latitude-longitude) from a global positioning system that uses satellite orbital positions as references would be an example of a non-local positioning system, as is a measurement given by a simple tape measure (which provides distance relative to the edge of its housing). In their basic forms, these devices provide measurements without regard to the coordinate system of the object being measured. It is up to the user (or some other system) to determine how those results apply to the situation.

Certain positioning systems 802 may not function well when obstructions are present. For example, laser positioning systems may only operate when a direct line of sight is available between a laser source and a target. Additionally, certain positioning systems 802 may be difficult, expensive or time consuming to configure or to add new measurement locations to. For example, it may be undesirable to configure a laser positioning system to identify positions of targets at every possible location within an area served by the laser positioning system. In a particular embodiment, the portable device 820 enables determination of position and orientation information in areas not serviced directly by the positioning system 802 (e.g., because the areas are outside the direct measurement area of the positioning system 802 or because obstructions reduce accuracy of measurements taken by the positioning system 802). For example, large-scale manufacturing and maintenance facilities may use a local positioning system, such as the positioning system 802, to guide assembly and maintenance functions. Examples of such facilities may include aircraft assembly facilities, ship building facilities, oil platform and other large equipment manufacturing and maintenance facilities. Such facilities may use line-of-sight measurement systems, such as laser positioning systems, to determine position information exterior to a system being assembled (e.g., an aircraft, ship, etc.). However, such line-of-sight measurement systems may be difficult, expensive or unwieldy to utilize at certain location, such as locations inside the system being assembled. The portable device 820 may be utilized by the personnel working inside the system being assembled to determine position and orientation information. In a particular embodiment, the portable device 820 may be the portable device 102 described with reference to FIG. 1 or the portable device 230 described with reference to FIG. 2.

The positioning system 802 may include one or more local position detectors 804 to determine a position of a location on a target structure (not shown in FIG. 8). In a particular embodiment, the local position detectors 804 include laser devices adapted to transmit laser beams 862 at target locations 852. The positioning system 802 may also include a processor 806. The target locations 852 may be at known locations on the target structure and may be used by processor 806 and coordinate transformation software to calibrate the local position detector(s) 804 to a target structure coordinate system. The target structure may include an aircraft, a spacecraft, a land craft, a watercraft, or another repositionable structure that is moved into a location for maintenance, for assembly, or for other purposes. In other examples, the target structure may be a stationary object. The processor 806 of the positioning system 802 may have access to a database 808 that includes electronic representations 810 of the target structure. For example, the electronic representations 810 may include electronic diagrams, drawings or models of the target structure, such as computer-aided design drawings or three-dimensional models that provide local position information of locations of interest on the target structure. Additionally, the electronic representations may include design or as-built drawings or measured data (e.g., measurements taken for use by the local positioning system) indicating specifics (e.g., dimensions or characteristics) of the target structure.

The portable device 820 includes a calibration component 826. The calibration component 826 communicates with the positioning system 802 to specify an initial position and orientation of the portable device 820. For example, the initial position and orientation may be specified with reference to a specific location on the target structure.

The portable device 820 may also include at least one movement sensor 828 (e.g., the IMU 108 or the IMU 234). For example, the at least one movement sensor 828 may include one or more inertial sensors (e.g., microelectromechanical sensors, such as accelerometers or gyroscopes) capable of measuring linear and rotational acceleration and/or velocity. The at least one movement sensor 828 may detect movement of the portable device 820 after the initial position and orientation of the portable device 820 is determined. To illustrate, the portable device 820 may be initialized in a calibration frame 850. The position and orientation of the calibration frame 850 may be known or may be determined by the positioning system 802. The position and orientation of the calibration frame 850 may be stored in a memory 824 of the portable device 820. In a particular embodiment, the position and orientation of the calibration frame 850 are initialized in the memory 824 as an origin position and orientation of the local coordinate system. That is, the initial position and orientation of the portable device 820 in the calibration frame 850 are the origin from which relative motions of the portable device 820 are measured. In this embodiment, the position and orientation of the portable device 820 can be determined by distance and direction away from the origin location (i.e., the calibration frame 850). In other embodiments, other origin locations are selected, such as a predetermined reference location on the target structure. A spatial relationship between the calibration frame 850 and the local position detectors 804 may be known or determined. For example, the calibration frame 850 may be placed at a known location on the target structure. In addition or in the alternative, the calibration frame 850 may include the target locations 852 that are detectable by the local positioning detectors 804 to enable the positioning system 802 to determine the position and orientation of the calibration frame 850 in the target structure. After the relative positions and orientations are determined from motions of the portable device 820, the relative positions and orientations are used along with the calibration frame position and orientation to compute the resulting position and orientation of the portable device 820 in the coordinate system of the target structure.

The portable device 820 may also include a processor 822. The processor 822 may determine a measured position and orientation of the portable device 820 based on the initial position and orientation of the portable device 820 and the detected movement of the portable device 820. For example, the processor 822 may determine the measured position and orientation of the portable device 820 within the target structure's local coordinate system. In a particular embodiment, the memory 824 is accessible to the processor 822. The memory 824 may store target component data 840. The target component data 840 may specify locations of components of the target structure in the local coordinate system. The processor 822 may determine a spatial relationship of the portable device 820 to at least one of the components based on the measured position and orientation and the target component data 840. For example, the processor 822 may determine a distance from the portable device 820 to at least one of the components, a direction from the portable device 820 to at least one of the components, or both. In a particular embodiment, as described with reference to FIGS. 1-7, the processor 822 may correct errors in a particular measured position and/or orientation by determining boundary conditions (e.g., known position and acceleration measurements that are used to extrapolate error correction calculations) around the particular measure position and/or orientation.

The portable device 820 may also include an input device 832. The input device 832 may be used to receive target component data 840 specifying a target component of the components of the target structure, or location of interest data 842 on the component of the target structure. For example, the input device 832 may be used by an operator to input information identifying a particular component of the target structure that the operator desires to locate (i.e., the target component). The processor 822 may determine information about a spatial relationship between the portable device 820 and the target component based on the measured position and orientation and the target component data 840.

The portable device 820 may also include a pointer 834. The pointer 834 may be adapted to point to a location of the target component based on the spatial relationship. For example, the pointer 834 may include a needle, one or more light indicators, a display, or another device at the portable device 820 or coupled to the portable device 820 that points in the direction of the target component. In another example, the pointer 834 may include a laser or other light based pointing device. In this example, the pointer 834 may direct a beam of light in the direction of the target component. An on-board video camera (not shown) may also be used to indicate the pointing direction of the portable device 820.

In a particular embodiment, the portable device 820 includes an indicator 838. The processor 822 may activate the indicator 838 based on the spatial relationship of the portable device 820 to the target structure. In various embodiments, the indicator 838 includes different types of indication devices that are triggered to indicate various conditions. For example, the processor 822 may activate the indicator 838 when the portable device 820 is within a predetermined threshold distance of the target component. In another example, the processor 822 may activate the indicator 838 when the portable device 820 is within or approaching a particular portion of the target structure, such as an area that is off limits to certain personnel or an area that requires special protective equipment for entry. In another example, the indicator 838 may include an audible indicator, a visible indicator, or another indicator to indicate to the user that the portable device 820 is proximate to the target component (e.g., when a second threshold distance is satisfied). In another embodiment, the indicator may be activated to indicate that the portable device 820 is approaching a measurement limit (e.g., a maximum distance or time since a calibration was performed at a known location and acceleration.

In another example, the indicator 838 includes a laser projection device that can trace an outline or other shape associated with the target component or associated with a location where the target component should be. For example, when the target component data 840 identifies a component to be installed into the target structure, the laser projection device may project an outline of the target component at an installation location of the target component. The indicator 838 may also include a device to indicate that the target component may be out of a line of sight of the operator, such as behind a second component. To illustrate, when the target component is stored within a panel, within a different compartment, or behind another component of the portable device 820, the indicator 838 may indicate that the target component is out of the line of sight of the operator.

The processor 822 may trigger the indicator 838 when a threshold distance is satisfied. The processor 822 may trigger different indicators 838 when different threshold distances are satisfied. For example, a first indicator may be triggered when a first threshold distance is satisfied and a second indictor may be triggered when a second threshold distance is satisfied. The first threshold distance may be different from the second threshold distance, and the first indicator may be distinct from the second indicator. For example, the first indicator may include a first audible tone and the second indicator may include a second audible tone. In another example, the first indicator may include an audible tone and the second indicator may include a visible indication, such as a light. In yet another example, the first indicator may include a first visual indication, such as a first light and the second indicator may include a second visual indication, such as a second light. In this example, the lights may be visually distinct, such as different colors or at different locations on the portable device 820.

The threshold distance or the threshold distances may be determined based on an identification of the target component. For example, a larger threshold distance may be determined for a larger component, and a smaller threshold distance may be determined for a smaller component. In another example, a larger threshold distance may be selected for a component that is expected to be visible and a smaller threshold distance may be selected for a target component that is expected to be obscured (e.g., behind a panel or other component). In a particular embodiment, one or more of the indicators are activated to indicate a direction to the target component.

The portable device 820 may include a sensor 836. The sensor 836 may include a digital image sensor, a safety sensor (e.g., a gas or thermal sensor), a magnetometer, a non-destructive test or inspection sensor (e.g., an ultrasonic test sensor, a radiographic test sensor, an eddy-current test sensor, etc.), another sensor, or any combination thereof. The sensor 836 may capture data at the position of the portable device 820. The processor 822 may store captured data 844 (e.g., a captured digital image) with position data in the memory 824.

In a particular embodiment, the memory 824 may store positioning instructions (e.g., the positioning instructions 116) and drift correction instructions (e.g., the drift correction instructions 118). The positioning instructions and the drift correction instructions may be executable by the processor 822 to perform the methods described with reference to FIGS. 4-7.

In a particular embodiment, the portable device 820 includes an interface 830. The interface 830 may enable communication between the portable device 820 and one or more remote devices (such as a device of the positioning system 802 or the database 808). The interface 830 may include a wired interface, such as an Ethernet interface, a Universal Serial Bus (USB) interface, another standard or proprietary wired interface, or any combination thereof. The interface 830 may also or in the alternative include a wireless interface. For example, the interface 830 may send wireless transmissions 860 to communicate with the remote device. The wireless transmissions 860 may include infrared transmissions, radio frequency transmissions or another wireless transmission. The interface 830 may be used to initialize the portable device 820 or to send data gathered by the portable device 820 to the remote device. For example, the wireless transmissions 860 may be used to send the data descriptive of the measured position of the portable device 820 and the captured data 844 to the remote device. In another example, the interface 830 may be used to send target component data 812 from the database 808 to the portable device 820. To illustrate, the database 808 may include the electronic representations 810 of the target structure. The electronic representations 810 of the target structure may include design or as-built drawings or three dimensional electronic models of the target structure. Thus, the electronic representations 810 of the target structure may be relatively large electronic files. Due to size or cost constraints, the memory 824 of the portable device 820 may not have capacity to store all of the electronic representations 810 of the target structure. Accordingly, the memory 824 of the portable device 820 may store only a relevant portion of the electronic representations 810 of the target structure, such as the target component data 812, 840.

In operation, the portable device 820 may be used by an operator to locate the target component of the target structure, to gather sensed data within the target structure, to identify a component at a particular location of the target structure, or for other purposes. To illustrate, an operator attempting to locate the target component may input the target component data 840 identifying the target component via the input device 832. The position of the target component may be determined by the processor 822 of the portable device 820 or by a processor 806 of a remote device based on the electronic representations 810 of the target structure and the target component data 812, 840. The indicator 838 may provide information to the operator regarding a direction, a distance, or the direction and distance to the target component. Additionally, the indicator 838 may provide other information to aid the operator in locating the target component. For example, the indicator 838 may include a display screen that displays a text description of the target component or the location of the target component, displays a photograph or diagram illustrating the target component, etc. In another example, the indicator 838 may include one or more lights, moveable arrows or other devices that indicate the direction or distance to the target component. In yet another example, the indicator 838 may include a pointer, such as a visible laser, that points in the direction of the target component. In still another example, the indicator 838 may include one or more audible or haptic output devices to indicate a direction or distance to the target component. To illustrate, a vibrating element or a buzzer may be triggered when the operator moves the portable device 820 to within a predetermined distance of the target component. The predetermined distance may be selected based on how easily the operator would be expected to identify the component. For example, the predetermined distance may be shorter (i.e., nearer to the component) for smaller components than for larger components. In another example, the predetermined distance may be shorter when the component would normally be obscured from view by the operator by another component.

To illustrate another operational example, an operator may use the portable device 820 to gather or store the captured data 844. For example, when the operator is performing an inspection of the target structure, the portable device 820 may be used to capture and store inspection findings along with location information. To illustrate, the portable device 820 may be carried by the operator during non-destructive testing and inspection. The sensor 836 of the portable device 820 may be used to capture the captured data 844, which may be stored with location information indicating where the captured data 844 was captured. In another example, the sensor 836 may include an image sensor. When the operator identifies a concern, the image sensor may be used to capture an image of the area of concern, which may be stored as the captured data 844 along with the location where the image was captured.

To illustrate another operational example, the portable device 820 may be used by the operator to assist with identifying a component at a particular location of the target structure. For example, the input device 832 may be used by the operator to select a particular position. The processor 822 of the portable device 820 or the processor 806 of the remote device may determine components of the target structure that are near the particular position. In a particular embodiment, the pointer 834 can be used by the operator to point to the particular component. For example, the pointer 834 may include a laser device that generates a visible beam of light. The operator may point the beam of light at the component and use the input device 832 to generate a query regarding the identity of the component. The query may request information regarding the component, such as an identification of the component, a purpose of the component, maintenance or assembly data regarding the component (e.g., torque specifications), or any combination thereof.

FIG. 9 is an illustration of another embodiment of a local positioning system including a portable device. The local positioning system may include one or more local position detectors 902 to determine a position of a location of interest in or on a target structure 900 within a first coordinate system. In a particular embodiment, the local position detectors 902 include laser devices adapted to direct laser beams 920 at calibration targets 922 and to determine positions of the calibration targets 922 within the first coordinate system. Additionally, each of the local position detectors 902 may include a target so that each of the local position detectors 902 can determine positions of the other local position detectors 902. Although only three local position detectors 902 are illustrated in FIG. 9, the local positioning system may include more or fewer local position detectors 902 depending on the specific implementation.

The local position detectors 902 may be placed at known locations within the first coordinate system, such as a coordinate system associated with a manufacturing or maintenance area. Alternatively, the position detector 902 may be placed at a location that is initially unknown, and then use known reference locations on the target structure to determine its relative position and orientation to the target in the coordinate system of the target structure. The target structure 900 may include an aircraft, a spacecraft, a land craft, a watercraft, or another repositionable structure that is moved into the local coordinate system for maintenance, for assembly, or for other purposes. Target structure 900 may also include stationary objects such as buildings, or large objects moving at a constant velocity (zero acceleration) on which all elements within the environment are stationary relative to each other, such as a cruise ship or an aircraft carrier. The calibration targets 922 may be applied to the target structure 900 for sensing by the local position detectors 902, or the calibration targets 922 may be features of know location specified in the local coordinates of the target structure 900. For example, as illustrated in FIG. 9, the target structure 900 is an aircraft and the calibration targets 922 are placed on wings 912 and at a nose of a fuselage 910 of the aircraft. More or fewer calibration targets 922 may be used depending on the particular target structure 900, the locations of the local position detectors 902 or other factors that affect position determination for the target structure 900 within the first coordinate system.

The local position detectors 902 may interact with a processor 914 to determine locations of the calibration targets 922 within the first coordinate system. The processor 914 or the local position detectors 902 may determine the position and orientation of the target structure 900 within the first coordinate system based on the locations of the calibration targets 922 and based on one or more electronic representations of the target structure 900. The electronic representations of the target structure 900 may include electronic diagrams, drawings or models of the target structure 900, such as computer-aided design drawings or three-dimensional models. Additionally, the electronic representations may include design or as-built drawings or measured data (e.g., measurements taken for use by the local positioning system) indicating specifics of the target structure 900.

The processor 914 may also determine a second coordinate system based on the position and orientation of the target structure 900 within the first coordinate system. For example, the first coordinate system may be a local coordinate system (i.e., a coordinate system associated with the target structure) or a non-local coordinate system (i.e., a coordinate system associated with something other than the target structure, such as a building or a global reference system). Examples of non-local coordinate systems include coordinate systems that specify locations with reference to features that are not on the target structure, such as global systems that specify locations based on distances or directions to global features (e.g., global positioning coordinates, longitude and latitude, and so forth). In local coordinate systems, locations may be specified with reference to one or more known locations or features defined relative to the target structure.

In the second coordinate system, positions may be specified by distance and/or direction from features of the target structure 900. For example, a position may be specified by a distance and direction from the nose of the fuselage 910 of the aircraft illustrated in FIG. 9. The processor 914 may determine a relationship between positions in the first coordinate system and the second coordinate system based on the position and orientation of the target structure 900 within the first coordinate system and the electronic representations of the target structure 900.

FIG. 9 also shows a portable device 934 disposed in a calibration frame 930. For example, the portable device 934 may be a portable device such as the portable device 820 of FIG. 8 and the calibration frame 930 may be a calibration frame such as the calibration frame 850 of FIG. 8. In another particular embodiment, the portable device 934 may be the portable device 102 described with reference to FIG. 1 or the portable device 230 described with reference to FIG. 2. The calibration frame 930 may be placed at a known position and orientation in the first coordinate system of the target structure. A spatial relationship between the calibration frame 930 and the local position detectors 902 may be known. For example, the calibration frame 930 and the local position detectors 902 may be placed at fixed, known positions within the first coordinate system. The calibration frame 930 may be located on or in the target structure 900, or the calibration frame 930 may be placed in other locations as long as its position and orientation are defined in the local target coordinate system. In addition or in the alternative, the calibration frame 930 may include one or more targets 932 that are detectable by the local positioning detectors 902 to enable the local positioning system to determine the position and orientation of the calibration frame 930 relative to the local position detectors 902 within the first coordinate system of the target structure.

The portable device 934 may include a memory to store an initial position and orientation of the portable device 934. The initial position and orientation of the portable device 934 may be stored relative to the first coordinate system, the second coordinate system, or both. In a particular embodiment, the position of the calibration frame 930 is set as an origin position of the second coordinate system. Thus, the memory of the portable device 934 may initially be set to zero in the calibration frame 930, indicating no movement from the origin position.

The portable device 934 may also include one or more movement sensors (e.g., the IMU 108 or the IMU 234) to detect movement of the portable device 934. For example, the movement sensors may include one or more microelectromechanical systems (MEMS), such as sensor devices that measure relative acceleration and velocity. The movement detected by the movement sensors may be used by the processor 914 to calculate a position and orientation of the portable device 934 after it is moved. The processor 914 may also be configured to provide an estimate of linear and rotational displacement during motion. In a particular embodiment, the processor 914 is onboard the portable device 934. In other embodiments, the processor 914 is external to the portable device 934. The processor 914 may determine a calculated position and orientation of the portable device 934 within the target structure 900 or near the target structure 900 based on the initial position and orientation of the portable device 934 (e.g., within the calibration frame 930) and based on movement of the portable device 934 detected by the one or more movement sensors.

To illustrate, the local positioning detectors 902 may include line-of-sight detectors, such as laser devices. Thus, positions at portions of the target structure 900 that are not within line of sight of the local position detectors 902, such as inside the fuselage 910, inside a wheel well (not shown), behind an obstruction, such as the wings 912 or other components of the target structure 900, may not be detectable by the local positioning detectors 902. Accordingly, the portable device 934 may be used to determine positions obscured from the local positioning detectors 902 or where placement of a target 922 would be burdensome or not desirable. In these cases, measurements will be based on the initial position and orientation of the portable device 934 and sensed relative motion of the portable device 934.

In operation, the portable device 934 may be used by an operator to locate components of the target structure 900, to gather or store information about a particular location of the target structure 900, to identify a component at a particular location of the target structure, or for other purposes. To illustrate, an operator attempting to locate a component of the target structure 900 may input information identifying the component at the portable device 934 or at a computing device (not shown) that downloads information to the portable device 934. A position of the component may be determined based on the electronic representations of the target structure 900. The processor 914 may determine the position of the component relative to the target structure 900, relative to the location of the portable device 934 (e.g., within the calibration frame 930), or relative to another location that can be readily identified by the operator.

In a particular embodiment, the portable device 934 includes an operator interface to provide information to the operator regarding the location of the component. For example, the operator interface may include a display screen. The display screen may display information to the operator regarding a direction, a distance, or the direction and distance to the component. Additionally, the display screen may provide other information to aid the operator in locating the component. For example, the operator interface may display a text description of the component or the location of the component or may display a photograph or diagram illustrating the component, etc. The operator interface may include other output devices in addition to or instead of a display screen. For example, the operator interface may include one or more indicators (e.g., lights, moveable arrows, etc.) adapted to indicate the direction or distance to the component. In another example, the operator interface may include a pointer, such as a visible laser, that points in the direction of the component. In still another example, the operator interface may include one or more audible or haptic output devices to indicate the direction or distance to the component. To illustrate, a vibrating element or a buzzer may be triggered when the operator takes the portable device 934 to within a predetermined distance of the component. The predetermined distance may be selected based on how easily the operator would be expected to identify the component. For example, the predetermined distance may be shorter (i.e., nearer to the component) for smaller components than for larger components. In another example, the predetermined distance may be shorter when the component would normally be obscured from view by another component (e.g., behind a panel).

To illustrate another operational example, an operator may use the portable device 934 to gather or store position data. For example, when the operator is performing an inspection, the portable device 934 may be used to ensure that locations inspected are correct or to store inspection findings with correct location information. To illustrate, the portable device 934 may be carried by the operator during non-destructive testing. Results of the non-destructive testing may be stored with output from the portable device 934 to ensure that appropriate locations were tested and to enable subsequently finding positions where the testing was performed. In another example, the portable device 934 may include or be included within a portable testing device or camera that includes a sensor used for testing or inspection of the target structure 900. When the operator identifies a concern, the portable device 934 may be used to store location and sensed data. For example, the operator may capture a digital image of an area of concern and the position of the area of concern may be stored with the digital image.

To illustrate another operational example, the portable device 934 may be used by the operator to assist with identifying a component at a particular location of the target structure 900. For example, the portable device 934 may include an input that the operator can use to select a particular position. The processor 914 may determine components of the target structure 900 that are near the particular position. The input may include a trigger, a button or another input device. In a particular embodiment, the portable device 934 includes a pointing device operable by the operator to point to the particular component. For example, the portable device 934 may include a laser device that generates a visible beam of light.

The operator may point the beam of light at the component and select the input to generate a query. The query may request information regarding the component, such as an identification of the component, a purpose of the component, maintenance or assembly data regarding the component (e.g., torque specifications), or any combination thereof.

In a particular embodiment, the portable device 934 may include a memory storing positioning instructions (e.g., the positioning instructions 116) and drift correction instructions (e.g., the drift correction instructions 118). The processor 914 may determine the calculated position and orientation of the portable device 934 within the target structure 900 using the positioning instructions and the drift correction instructions. For example, the initial position and orientation of the portable device 934 may be the starting location (e.g., the starting location 202 of FIG. 2). The initial position and orientation of the portable device 934 may be determined using the calibration frame 930. The position of the portable device 934 within the target structure 900 may be an intermediate location (e.g., the intermediate location 204). An ending position (e.g., the ending position 212) may be determined when the portable device 934 is placed into the calibration frame 930, or in another calibration frame (not shown). The processor 914 may determine the calculated position and orientation of the portable device 934 within the target structure 910 using the systems and methods described with reference to FIGS. 1-7.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:
1. A method comprising:
   initializing an inertial measurement unit (IMU) of a portable device at a starting location;
   generating first acceleration data by the IMU as the portable device is moved to an intermediate location;

receiving, at the portable device, an indication that the IMU is at the intermediate location;

generating second acceleration data by the IMU as the portable device is moved to an ending location;

calculating, by a processor of the portable device, an initial position estimate of the ending location based on a known position of the starting location, the first acceleration data, and the second acceleration data;

calculating, by the processor, corrected acceleration data based on a difference between the initial position estimate of the ending location and a known position of the ending location;

determining, by the processor, a position of the intermediate location based on the corrected acceleration data, and generating an output indicating the position of the intermediate location.

2. The method of claim 1, wherein calculating corrected acceleration data includes applying an initial correction to each of multiple measured acceleration data points based on a beginning acceleration at the starting location and an ending acceleration at the ending location.

3. The method of claim 1, wherein calculating the corrected acceleration data includes:

selecting, by the processor, a candidate acceleration offset value;

applying, by the processor, the candidate acceleration offset value to each of multiple measured acceleration data points to form candidate corrected data;

determining, by the processor, a corrected calculated position for each of the multiple measured acceleration data points based on the candidate corrected data; and determining, by the processor, whether the corrected calculated position of the ending location matches the known position of the ending location to within a specified tolerance;

wherein the processor ends an iterative refinement process when the corrected calculated position of the ending location matches the known position of the ending location to within the specified tolerance.

4. The method of claim 3, wherein the specified tolerance is stored in a memory of the portable device as an adjustable threshold based on desired accuracy of measurement of the position of the intermediate location.

5. The method of claim 3, wherein the processor uses the candidate corrected data as the corrected acceleration data when the iterative refinement process ends.

6. The method of claim 3, wherein the processor determines the candidate acceleration offset value using a root finding technique.

7. The method of claim 1, further comprising:

sending a signal, from the portable device to an application, the signal including information identifying the starting location; and receiving, at the portable device, data indicating the known position of the starting location from the application in response to the signal.

8. The method of claim 1, further comprising storing, in a memory of the portable device, data indicating a first velocity and a first acceleration of the IMU at the starting location and a second velocity and a second acceleration of the IMU at the ending location.

9. The method of claim 1, wherein the starting location is the same as the ending location.

10. The method of claim 1, wherein positions determined based on the corrected acceleration data are calculated in three dimensions.

11. The method of claim 1, further comprising:

determining, by the processor, an error estimate as the IMU is moved from the starting location to the ending location; and generating, by the portable device, a notification if the error estimate satisfies a threshold error estimate.

12. The method of claim 11, wherein the notification includes an audible output, a visual output, a haptic output, or a combination thereof.

13. An apparatus comprising:

a portable device including:

a memory;

an inertial measurement unit (IMU); and a processor configured to:

initialize the IMU at a starting location;

receive, from the IMU, first acceleration data as the portable device is moved to an intermediate location;

receive an indication that the IMU is at the intermediate location;

receive, from the IMU, second acceleration data as the portable device is moved to an ending location;

calculate a position of the ending location based on a known position of the starting location, the first acceleration data, and the second acceleration data;

calculate corrected acceleration data based on a difference between the calculated position of the ending location and a known location position of the ending location;

determine a position of the intermediate location based on the corrected acceleration data, and generate an output indicating the position of the intermediate location.

14. The positioning device of claim 13, further comprising an interface to receive data indicating the starting location, the ending location, or both, from a plurality of position detectors external to the positioning device.

15. The positioning device of claim 13, wherein the processor calculates the corrected acceleration data by applying an initial correction to each of multiple measured acceleration data points based on a beginning acceleration at the starting location and an ending acceleration at the ending location.

16. The positioning device of claim 13, wherein calculating the corrected acceleration data is performed using an iterative refinement process that includes:

selecting a candidate acceleration offset value;

applying the candidate acceleration offset value to each of multiple measured acceleration data points to form candidate corrected acceleration data;

determining a corrected calculated position for each of the multiple measured acceleration data points based on the candidate corrected acceleration data; and determining whether the corrected calculated position of the ending location matches the known position of the ending location to within a specified tolerance;

wherein the processor ends the iterative refinement process when the corrected calculated position of the ending location matches the known position of the ending location to within the specified tolerance.

17. The positioning device of claim 13, wherein the processor is configured to store a velocity and an acceleration of the IMU for at least the starting location and the ending location at the memory.

18. The positioning device of claim 13, wherein processor is configured to calculate positions based on the corrected acceleration data in three dimensions.

19. The positioning device of claim 13, wherein the starting location is the same as the ending location.

20. A non-transitory computer-readable storage medium comprising instructions that, when executed by a processor of a portable device that includes an inertial measurement unit (IMU), cause the processor to:
- initialize the IMU at a starting location;
- receive first acceleration data from the IMU as the portable device is moved to an intermediate location;
- receive an indication that the IMU is at the intermediate location;
- receive second acceleration data from the IMU as the portable device is moved to an ending location;
- calculate a position of the ending location based on a known position of the starting location, the first acceleration data, and the second acceleration data;
- calculate corrected acceleration data based on a difference between the calculated position of the ending location and a known location position of the ending location;
- determine a position of the intermediate location based on the corrected acceleration data, and
- generate an output indicating the position of the intermediate location.

\* \* \* \* \*